US012185362B2

(12) United States Patent
Abdelghaffar et al.

(10) Patent No.: US 12,185,362 B2
(45) Date of Patent: Dec. 31, 2024

(54) PRIORITY AND COLLISION HANDLING TECHNIQUES FOR WIRELESS COMMUNICATIONS SYSTEMS

(71) Applicant: QUALCOMM Incorporated, San Diego, CA (US)

(72) Inventors: Muhammad Sayed Khairy Abdelghaffar, San Jose, CA (US); Seyedkianoush Hosseini, San Diego, CA (US); Huilin Xu, Temecula, CA (US); Abdelrahman Mohamed Ahmed Mohamed Ibrahim, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 769 days.

(21) Appl. No.: 17/378,552

(22) Filed: Jul. 16, 2021

(65) Prior Publication Data

US 2023/0018272 A1    Jan. 19, 2023

(51) Int. Cl.
*H04W 72/12*    (2023.01)
*H04L 5/16*    (2006.01)
(Continued)

(52) U.S. Cl.
CPC ............ *H04W 72/566* (2023.01); *H04L 5/16* (2013.01); *H04W 24/08* (2013.01); *H04W 72/0446* (2013.01); *H04W 72/1273* (2013.01)

(58) Field of Classification Search
CPC .. H04W 72/1273; H04W 72/0446; H04L 5/16
See application file for complete search history.

(56) References Cited

U.S. PATENT DOCUMENTS

2020/0169377 A1* 5/2020 Lee ................... H04W 56/0015
2021/0328733 A1* 10/2021 Zhang ................... H04L 5/0037

FOREIGN PATENT DOCUMENTS

WO    WO-2020146510 A1 *  7/2020    ........... H04L 5/1469
WO    WO-2021089797 A1    5/2021

OTHER PUBLICATIONS

Sony: "Half-Duplex FDD Operation for Redcap UEs",3GPP TSG RAN WG1#104 bis_e, R1-2103309, 3rd Generation Partnership Project (3GPP), Mobile Competence Centre ,650,Route Des Lucioles F-06921 Sophia-Antipolis Cedex, France, vol. RANWG1. (Year: 2021).*

(Continued)

*Primary Examiner* — Romani Ohri
(74) *Attorney, Agent, or Firm* — Paul M. McAdams; Holland & Hart LLP

(57) ABSTRACT

Methods, systems, and devices for wireless communications are described. In a wireless communications system, a user equipment (UE) may receive control signaling indicating a first semi-static configuration for transmitting uplink signaling and a second semi-static configuration for receiving downlink signaling. In some cases, the UE may operate using half-duplex communications and may monitor for a transmission direction conflict between the first semi-static configuration and the second semi-static configuration during a transmission time interval. The UE may communicate, according to a priority rule, one of an uplink signal in accordance with the first semi-static configuration or a downlink signal in accordance with the second semi-static configuration during the transmission time interval based on the monitoring. Additionally, or alternatively, the UE may drop one of the uplink signal or downlink signal according to the priority rule.

30 Claims, 14 Drawing Sheets

(51) Int. Cl.
  *H04W 24/08* (2009.01)
  *H04W 72/0446* (2023.01)
  *H04W 72/1273* (2023.01)
  *H04W 72/566* (2023.01)

(56) References Cited

OTHER PUBLICATIONS

Interdigital., et al., "Duplex Operation for RedCap UEs", 3GPP TSG RAN WG1 #104b-e, R1-2103423, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021, 4 Pages, XP052178161, p. 3-p. 4.

International Search Report and Written Opinion—PCT/US2022/034578—ISA/EPO—Sep. 29, 2022.

Sony: "Half-Duplex FDD Operation for Redcap UEs", 3GPP TSG RAN WG1#104bis_e, R1-2103309, 3rd Generation Partnership Project (3GPP), Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021, 4 Pages, XP052178076, p. 3-p. 4.

Xiaomi: "Discussion on Half-Duplex FDD Operation of Redcap UE", 3GPP TSG RAN WG1 #104b-e, R1-2102990, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 5, 2021, 3 Pages, XP051992610, p. 2.

\* cited by examiner

PRIORITY AND COLLISION HANDLING TECHNIQUES FOR WIRELESS COMMUNICATIONS SYSTEMS

FIELD OF TECHNOLOGY

The following relates to wireless communications, including priority and collision handling techniques for wireless communications systems.

BACKGROUND

The following relates to wireless communications, including priority and collision handling techniques for wireless communications systems. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, devices in a wireless communications system may communicate via uplink transmissions, downlink transmissions, or both. However, in some cases uplink transmissions and downlink transmissions may be communicated on the same time-frequency resources (e.g., devices may experience collisions between the transmissions), which may result in interference, reduced efficiency in the system, or both.

SUMMARY

The described techniques relate to improved methods, systems, devices, and apparatuses that support priority and collision handling techniques for wireless communications systems. Generally, the described techniques provide devices (e.g., a user equipment (UE)) with one or more rules for priority and collision handling in wireless communications systems. In some examples, a UE may receive control signaling indicating a first semi-static configuration for transmitting uplink signaling or uplink channels and a second semi-static configuration for receiving a downlink signaling or downlink channels. In some cases, a radio resource control (RRC) message may be used to configure the first semi-static configuration and the second semi-static configuration, where the RRC message may be a part of the control signaling or in addition to the control signaling.

The UE may monitor for a transmission direction conflict (e.g., a collision) between the uplink signaling or uplink channels and the downlink signaling or downlink channels. For example, a conflict may occur between an uplink signal and a downlink signal scheduled in a flexible subband (e.g., a frequency range capable of supporting uplink and downlink communications) during the same transmission time interval (TTI) (e.g., a flexible slot). The UE may be operating using half-duplex communications and the UE may communicate one of the uplink signal or the downlink signal based on a priority rule (e.g., the UE may transmit or receive a first signal and drop a second signal according to the priority rule). Based on the priority rule, for example, the UE may communicate a higher priority signal, a signal with higher priority data (e.g., higher priority signal or channel contents), a signal with higher priority time domain behavior, a signal with a greater quantity of symbols, a signal in a same or different direction from the direction of the symbols preceding the conflict, or any combination thereof. In some examples, the uplink signal and the downlink signal may both be scheduled in a same full-duplex subband during a TTI, and the UE may monitor whether the signals overlap in corresponding uplink or downlink frequency resources. If there is a direction mismatch between the frequency resources of the signals and the subband formats of the full-duplex subband where the overlap is identified, the UE may communicate one of the uplink signal or the downlink signal and drop the other signal based on the one or more priority rules indicating which signal to communicate or drop.

A method for wireless communications at a UE is described. The method may include receiving control signaling indicating a first semi-static configuration for transmitting uplink signaling and a second semi-static configuration for receiving downlink signaling, monitoring, by the UE operating using half-duplex communication, for a transmission direction conflict between the first semi-static configuration and the second semi-static configuration during a TTI, and communicating, according to a priority rule, one of an uplink signal in accordance with the first semi-static configuration or a downlink signal in accordance with the second semi-static configuration during the TTI based on the monitoring.

An apparatus for wireless communications at a UE is described. The apparatus may include a processor, memory coupled with the processor, and instructions stored in the memory. The instructions may be executable by the processor to cause the apparatus to receive control signaling indicating a first semi-static configuration for transmitting uplink signaling and a second semi-static configuration for receiving downlink signaling, monitor, by the UE operating using half-duplex communication, for a transmission direction conflict between the first semi-static configuration and the second semi-static configuration during a TTI, and communicate, according to a priority rule, one of an uplink signal in accordance with the first semi-static configuration or a downlink signal in accordance with the second semi-static configuration during the TTI based on the monitoring.

Another apparatus for wireless communications at a UE is described. The apparatus may include means for receiving control signaling indicating a first semi-static configuration for transmitting uplink signaling and a second semi-static configuration for receiving downlink signaling, means for monitoring, by the UE operating using half-duplex communication, for a transmission direction conflict between the first semi-static configuration and the second semi-static configuration during a TTI, and means for communicating, according to a priority rule, one of an uplink signal in accordance with the first semi-static configuration or a downlink signal in accordance with the second semi-static configuration during the TTI based on the monitoring.

A non-transitory computer-readable medium storing code for wireless communications at a UE is described. The code may include instructions executable by a processor to receive control signaling indicating a first semi-static configuration for transmitting uplink signaling and a second semi-static configuration for receiving downlink signaling, monitor, by the UE operating using half-duplex communication, for a transmission direction conflict between the first semi-static configuration and the second semi-static configuration during a TTI, and communicate, according to a priority rule, one of an uplink signal in accordance with the first semi-static configuration or a downlink signal in accordance with the second semi-static configuration during the TTI based on the monitoring.

In some examples of the method, apparatuses, and non-transitory computer-readable medium described herein, the communicating may include operations, features, means, or instructions for communicating a first signal according to the priority rule indicating to communicate the first signal based on the first signal having a higher priority than a second signal, where the first signal includes the uplink signal and the second signal includes the downlink signal, or the first signal includes the downlink signal and the second signal includes the uplink signal.

In some examples of the method, apparatuses, and non-transitory computer-readable medium described herein, the communicating may include operations, features, means, or instructions for communicating a first signal according to the priority rule indicating to communicate the first signal based on the first signal including first information having a first priority and a second signal including second information having a second priority lower than the first priority, where the first signal includes the uplink signal and the second signal includes the downlink signal, or the first signal includes the downlink signal and the second signal includes the uplink signal.

In some examples of the method, apparatuses, and non-transitory computer-readable medium described herein, the communicating may include operations, features, means, or instructions for communicating a first signal according to the priority rule indicating to communicate the first signal based on the first signal including an aperiodic signal and a second signal including a semi-persistent or a periodic signal, or the first signal including the semi-persistent signal and the second signal including the periodic signal, where the first signal includes the uplink signal and the second signal includes the downlink signal, or the first signal includes the downlink signal and the second signal includes the uplink signal.

In some examples of the method, apparatuses, and non-transitory computer-readable medium described herein, the communicating may include operations, features, means, or instructions for communicating a first signal according to the priority rule indicating to communicate the first signal based on the first signal including a first quantity of symbols higher than a second quantity of symbols of a second signal, where the first signal includes the uplink signal and the second signal includes the downlink signal, or the first signal includes the downlink signal and the second signal includes the uplink signal.

In some examples of the method, apparatuses, and non-transitory computer-readable medium described herein, the communicating may include operations, features, means, or instructions for communicating a first signal according to the priority rule indicating to communicate the first signal based on the first signal having a longer format length than a format length of a second signal, where the first signal includes the uplink signal and the second signal includes the downlink signal, or the first signal includes the downlink signal and the second signal includes the uplink signal.

In some examples of the method, apparatuses, and non-transitory computer-readable medium described herein, the communicating may include operations, features, means, or instructions for communicating one of a first signal or a second signal according to the priority rule indicating to communicate one of the first signal or the second signal in a same transmission direction as a time duration preceding a resource allocated for communicating one of the first signal or the second signal, where the first signal includes the uplink signal and the second signal includes the downlink signal, or the first signal includes the downlink signal and the second signal includes the uplink signal.

In some examples of the method, apparatuses, and non-transitory computer-readable medium described herein, the communicating may include operations, features, means, or instructions for communicating the uplink signal according to the priority rule indicating to communicate the uplink signal based on the transmission direction conflict indicating a direction mismatch corresponding to resources of the downlink signal overlapping with an uplink subband of the full duplex TTI.

In some examples of the method, apparatuses, and non-transitory computer-readable medium described herein, the communicating may include operations, features, means, or instructions for communicating the uplink signal according to the priority rule indicating to communicate the uplink signal based on resources of the uplink signal fully overlapping with an uplink subband in the full duplex TTI, where the full duplex TTI includes the uplink subband and a flexible subband.

In some examples of the method, apparatuses, and non-transitory computer-readable medium described herein, the communicating may include operations, features, means, or instructions for communicating the downlink signal according to the priority rule indicating to communicate the downlink signal based on resources of the downlink signal fully overlapping with a downlink subband in the full duplex TTI, where the full duplex TTI includes the downlink subband and a flexible subband.

In some examples of the method, apparatuses, and non-transitory computer-readable medium described herein, the communicating may include operations, features, means, or instructions for identifying an absence of the transmission direction conflict based on monitoring for the transmission direction conflict between the first semi-static configuration and the second semi-static configuration during the full duplex TTI, and where the communicating may be based on the absence of the transmission direction conflict and the full duplex TTI including a downlink subband and an uplink subband.

In some examples of the method, apparatuses, and non-transitory computer-readable medium described herein, the communicating may include operations, features, means, or instructions for communicating, according to the priority rule, a first signal on a first component carrier (CC) in a same direction as a second signal on a second CC based on the transmission direction conflict occurring in the first CC, where the priority rule indicates to communicate the first signal on the first CC in the same direction as the second signal communicated on the second CC, where the first signal includes the uplink signal or the downlink signal.

In some examples of the method, apparatuses, and non-transitory computer-readable medium described herein, the communicating may include operations, features, means, or instructions for communicating, according to the priority rule, a first signal on a first CC in a same direction as a second signal on a second CC based on the transmission direction conflict occurring in the first CC, where the priority rule indicates to communicate the first signal on the first CC in the same direction as the second signal on the second CC based on a majority of directions of a set of multiple CCs including the direction of the first signal that may be the uplink signal or the downlink signal.

In some examples of the method, apparatuses, and non-transitory computer-readable medium described herein, the communicating may include operations, features, means, or instructions for communicating, according to the priority rule, a first signal on a first CC in a same direction as a second signal on a second CC based on the second CC corresponding to a primary cell (Pcell) or a secondary primary cell (SPcell).

In some examples of the method, apparatuses, and non-transitory computer-readable medium described herein, the communicating may include operations, features, means, or instructions for communicating a first signal on a first CC and a second signal on a second CC according to the priority rule indicating to communicate the first signal based on a frequency separation between the first signal on the first CC and the second signal on the second CC satisfying a threshold, where the first signal includes the uplink signal and the second signal includes the downlink signal, or the first signal includes the downlink signal and the second signal includes the uplink signal.

Some examples of the method, apparatuses, and non-transitory computer-readable medium described herein may further include operations, features, means, or instructions for dropping the uplink signal or the downlink signal based on the priority rule indicating to drop the uplink signal or the downlink signal and dropping a portion of the uplink signal or the downlink signal according to the priority rule indicating to partially or fully drop the uplink signal or the downlink signal based on a capability of the UE.

Some examples of the method, apparatuses, and non-transitory computer-readable medium described herein may further include operations, features, means, or instructions for receiving the control signaling that may be at least one radio resource control message.

In some examples of the method, apparatuses, and non-transitory computer-readable medium described herein, the first semi-static configuration includes a first periodicity for transmitting the uplink signaling and the second semi-static configuration includes a second periodicity for receiving the downlink signaling.

DETAILED DESCRIPTION

Figure 1:
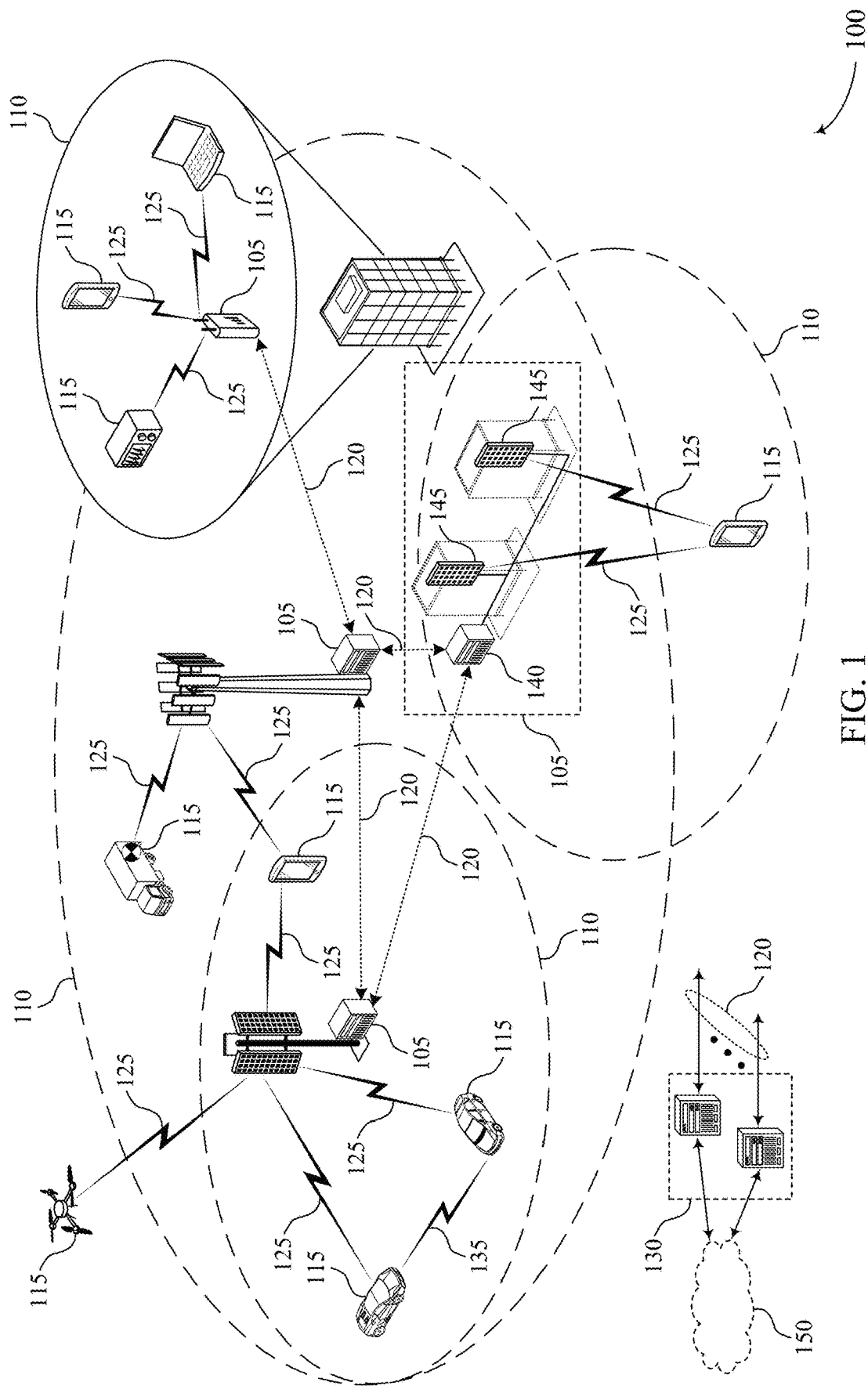
FIG. 1 illustrates an example of a wireless communications system that supports priority and collision handling techniques for wireless communications systems in accordance with aspects of the present disclosure.

In some wireless communication systems, a user equipment (UE) may experience collisions within flexible, uplink, or downlink symbols in a transmission time interval (TTI) due to multiple different semi-static configurations for uplink and downlink signals or channels. In some cases, the UE may receive an indication of a semi-static configuration for transmitting uplink signaling and a semi-static configuration for receiving downlink signaling, and the configurations may result in the uplink and downlink signaling occurring in a same TTI (e.g., in a flexible subband or a full-duplex subband). In some cases, a UE operating using half-duplex communications may be unable to resolve such a conflict. For example, the UE may be unable to both receive a downlink signal and transmit an uplink signal on the subband in the same TTI due to operating in a half-duplex mode.

Techniques described herein enable devices to use priority and collision handling for wireless communications systems. In some examples, a UE may receive control signaling indicating a first semi-static configuration for transmitting uplink signaling or downlink channels and a second semi-static configuration for receiving downlink signaling or downlink channels. In some cases, a radio resource control (RRC) message may be used to configure the first semi-static configuration and the second semi-static configuration, where the RRC message may be a part of the control signaling or in addition to the control signaling. The UE may monitor for a transmission direction conflict (e.g., a collision) between the uplink signaling or the uplink channels and the downlink signaling or the downlink channels. For example, a conflict may occur between an uplink signal and a downlink signal scheduled in a flexible subband (e.g., a frequency range capable of supporting uplink and downlink communications) during the same TTI (e.g., a flexible slot). The UE may be operating using half-duplex communications and the UE may communicate one of the uplink signal or the downlink signal and based on a priority rule (e.g., the UE may transmit or receive a first signal and drop a second signal according to the priority rule).

Based on the priority rule, for example, the UE may communicate (e.g., transmit or receive) a higher priority signal, a signal with higher priority data (e.g., a signal corresponding to higher priority signal or channel contents). In some examples, the UE may communicate a signal with higher priority time domain behavior. For example, the UE may communicate an aperiodic signal based on the priority rule indicating that the aperiodic signal corresponds to a higher priority than a signal with periodic behavior, among other examples of priorities and time domain behaviors. In some examples, the UE may communicate a signal with a greater quantity of symbols, such as a signal with a higher quantity of overlapping symbols or depending on an uplink control channel format length. In some examples, the UE may communicate a signal in a same or different direction from the direction of the symbols preceding the conflict. For example, the UE may determine whether a quantity of symbols between a last symbol for a downlink communication prior to the conflict and a first symbol of an uplink signal of the conflict satisfies a threshold duration (e.g., the UE may determine whether a capability of the UE supports switching from downlink to uplink in the quantity of symbols). If the threshold is satisfied, the UE may refer to other priority rules to select a signal for communication. If the threshold is not satisfied (e.g., the UE does not have enough time to switch to uplink), the UE may maintain a downlink mode and select the downlink signal for reception (e.g., the UE may drop the uplink signal based on the threshold not being satisfied).

In some examples, the uplink signal and the downlink signal may both be scheduled in a same full-duplex subband in a TTI. The TTI in which a full-duplex subband occurs may, in some cases, be referred to as a full-duplex TTI (e.g., a full-duplex slot). For example, the full-duplex subband may include a first subband for a first format, such as a downlink subband associated with scheduled downlink communications, an uplink subband associated with scheduled uplink communications, a flexible subband associated with scheduled uplink or downlink communications, or other examples of formats. The full-duplex subband may also include a second subband with a second format. The UE may monitor whether the signals overlap in corresponding uplink or downlink frequency resources. If there is a direction mismatch between the frequency resources of the signals and the subband formats of the full-duplex subband where the overlap is identified, the UE may communicate one of the uplink signal or the downlink signal and drop the other signal based on the one or more priority rules indicating which signal to communicate or drop. Additionally or alternatively, the UE may include communications on multiple component carriers (CCs). In some such examples, the UE may communicate one or more signals in each CC based on the priority rules indicating which signals to communicate in a respective carrier. Thus, the UE may drop a direction (e.g., uplink or downlink) signal based on the priority rule indicating to drop the signal or communicate the other signal. In some examples, the UE may partially drop the signal based on a capability of the UE. In some other examples, the UE may fully drop the signal based on the capability of the UE.

Particular aspects of the subject matter described herein may be implemented to realize one or more advantages. The described techniques may support improvements in priority and collision handling for wireless communications systems. For example, the UE may use priority rules to determine whether a downlink signal or an uplink signal is transmitted if there is a collision between the two signals, which may reduce power consumption and latency at the UE, therefore improving the overall quality of communications between wireless devices. As such, supported techniques may include improved network operations, and, in some examples, may promote network efficiencies, among other benefits.

Aspects of the disclosure are initially described in the context of wireless communications systems. Aspects of the disclosure are then described in the context of a collision, priority rules, and a process flow. Aspects of the disclosure are further illustrated by and described with reference to apparatus diagrams, system diagrams, and flowcharts that relate to priority and collision handling techniques for wireless communications systems.

FIG. 1 illustrates an example of a wireless communications system 100 that supports priority and collision handling techniques for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink CCs and one or more uplink CCs according to a carrier aggregation configuration. Carrier aggregation may be used with both frequency division duplexing (FDD) and time division duplexing (TDD) CCs.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a TTI. In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple CCs.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with CCs operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may use priority and collision handling techniques for the wireless communications system 100. The UE 115 may receive control signaling (e.g., from a base station 105) indicating a first semi-static configuration for transmitting uplink signaling or uplink channels and a second semi-static configuration for receiving downlink signaling or downlink channels. In some cases, an RRC message may be used to configure the first semi-static configuration and the second semi-static configuration, where the RRC message may be a part of the control signaling or in addition to the control signaling. The UE 115 may monitor for a transmission direction conflict (e.g., a collision) between the uplink signaling or the uplink channels and the downlink signaling or the downlink channels. For example, a conflict may occur between an uplink signal and a downlink signal scheduled in a flexible subband (e.g., a frequency range capable of supporting uplink and downlink communications) during the same TTI (e.g., a flexible slot).

The UE 115 may be operating using half-duplex communications and the UE may communicate one of the uplink signal or the downlink signal based on a priority rule (e.g., the UE 115 may transmit or receive a first signal and drop a second signal according to the priority rule). Based on the priority rule, for example, the UE 115 may communicate a higher priority signal, a signal with higher priority data (e.g., higher priority signal or channel contents), a signal with higher priority time domain behavior, a signal with a greater quantity of symbols, a signal in a same or different direction from the direction of the symbols preceding the conflict, or any combination thereof. In some examples, the uplink signal and the downlink signal may both be scheduled in a same full-duplex subband during a TTI, and the UE 115 may monitor whether the signals overlap in corresponding uplink or downlink frequency resources. If there is a direction mismatch between the frequency resources of the signals and the subband formats of the full-duplex subband where the overlap is identified, the UE 115 may communicate one of the uplink signal or the downlink signal and drop the other signal based on the one or more priority rules indicating which signal to communicate or drop.

Figure 2:
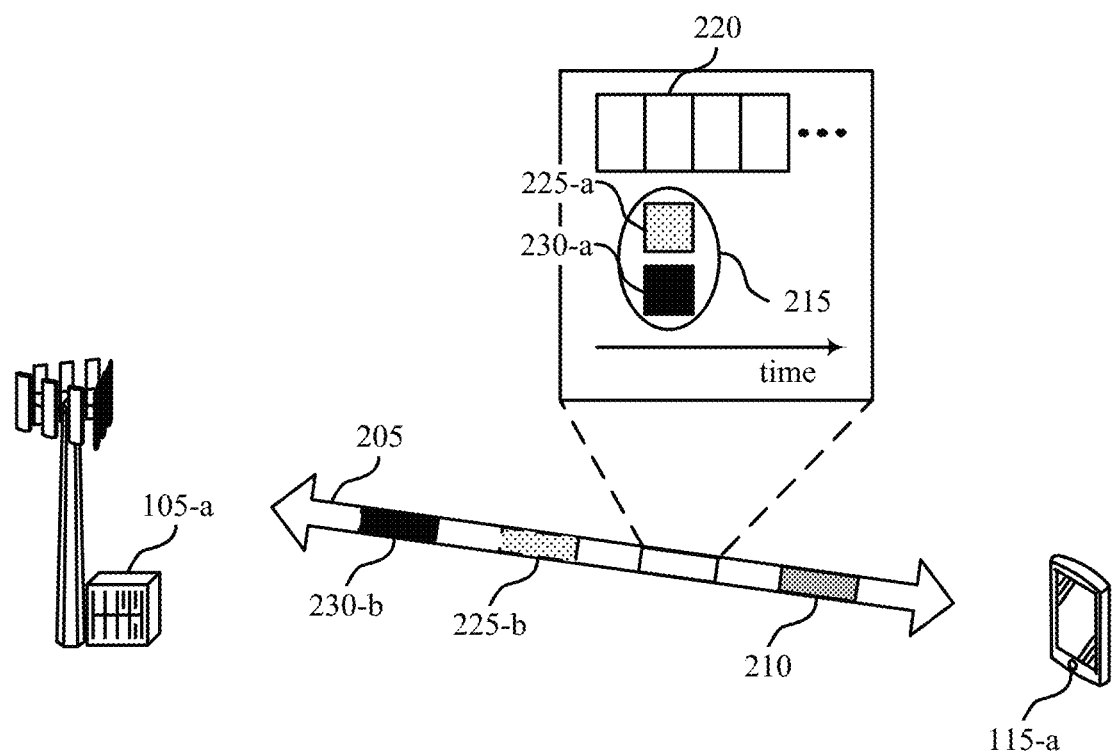
FIG. 2 illustrates an example of a wireless communications system that supports priority and collision handling techniques for wireless communications systems in accordance with aspects of the present disclosure.

FIG. 2 illustrates an example of a wireless communications system 200 that supports priority and collision handling techniques for wireless communications systems in accordance with aspects of the present disclosure. In some examples, the wireless communications system 200 may implement aspects of the wireless communications system 100 or may be implemented by aspects of the wireless communications system 100. For example, the wireless communications system 200 may include a UE 115-*a* and a base station 105-*a*, which may be examples of corresponding devices described herein with reference to FIG. 1. The wireless communications system 200 may include features for improved communications between the UE 115-*a* and the base station 105-*a*, among other benefits.

In some cases, a collision may occur while the UE 115-*a* is operating in an NR TDD mode. The UE 115-*a* may use priority rules to handle a collision that occurs between different signals or channels within a CC. For example, the collision may occur between different uplink signals or channels and the UE 115-*a* may use a priority rule to determine which uplink signal or channel is dropped. Within a flexible subband (e.g., a frequency range capable of supporting uplink and downlink communications) during the same TTI (e.g., a flexible slot), there may be particular rules to handle a collision between a dynamic grant (DG) and a semi-static configured uplink or downlink signal or channel. In some cases, the UE 115-*a* may select whether to follow a dynamic configuration (e.g., via downlink control information (DCI)) or a semi-static configuration.

In some cases, the UE 115-*a* may be capable of collision handling between uplink signals or channels within a flexible or uplink subband in a TTI (e.g., a symbol in a slot). For example, if a physical uplink shared channel (PUSCH) transmission with a priority index 1 or a physical uplink control channel (PUCCH) transmission with a priority index 1 overlaps in time with a sounding reference signal (SRS) transmission on a serving cell, the UE 115-*a* may refrain from transmitting the SRS in the overlapping one or more subbands. In some cases, for a PUCCH and an SRS on a same carrier, the UE 115-*a* may refrain from transmitting the SRS when a semi-persistent SRS or a periodic SRS is configured in the same one or more subbands, with a PUCCH carrying one or more channel state information (CSI) reports, one or more L1-RSRP reports, or one or more L1-SINR reports. In some examples, the UE 115-*a* may refrain from transmitting the SRS when a semi-persistent SRS or a periodic SRS is configured, or when an aperiodic SRS is triggered to be transmitted in the same one or more subbands, with a PUCCH carrying HARQ-ACK, a link recovery request, a scheduling request (SR), or a combination thereof. In the case that the UE 115-*a* refrains from transmitting the SRS due to an overlap with the PUCCH, the one or more SRS subbands that overlap with the one or more PUCCH subbands are dropped. The UE 115-*a* may refrain from transmitting the PUCCH when an aperiodic SRS is triggered to be transmitted to overlap in the same subbands with a PUCCH carrying one or more semi-persistent or periodic CSI reports, one or more semi-persistent or periodic L1-RSRP reports, or one or more L1-SINR reports.

In some examples, a collision may occur between uplink and downlink semi-static configurations and a DG within a flexible TTI. For operation on a single carrier in an unpaired spectrum, the UE 115-*a* may be configured by higher layers to receive a physical downlink control channel (PDCCH), a physical downlink shared channel (PDSCH), or a CSI reference signal (CSI-RS) in a set of subbands of a TTI (e.g., within a set of symbols of a slot). The UE 115-*a* may receive the PDCCH, the PDSCH, or the CSI-RS if the UE 115-*a* fails to detect a DCI format 0_0, a DCI format 0_1, a DCI format 1_0, a DCI format 1_1, or a DCI format 2_3, which may indicate to the UE 115-*a* to transmit a PUSCH, a PUCCH, a physical random access channel (PRACH), or an SRS in at least one subband of the set of subbands of the TTI. Otherwise, the UE 115-*a* may fail to receive the PDCCH, the PDSCH, or the CSI-RS in the set of subbands of the TTI.

For operation on a single carrier in an unpaired spectrum, the UE 115-*a* may be configured by higher layers to transmit an SRS, a PUCCH, a PUSCH, or a PRACH in a set of subbands of a TTI (e.g., a set of symbols of a slot). The UE 115-*a* may detect a DCI format 1_0, a DCI format 1_1, or a DCI format 0_1, which may indicate to the UE 115-*a* to receive the CSI-RS or the PDSCH in a subset of subbands from the set of subbands. In some cases, the UE 115-*a* may refrain from expecting to cancel the transmission in subbands from the set of subbands that occur, relative to a last subband of a CORESET where the UE 115-*a* may detect the DCI format 1_0, the DCI format 1_1, or the DCI format 0_1. After a number of subbands that is smaller than the PUSCH preparation time $T_{proc,2}$ for the corresponding processing capability of the UE 115-*a*, assuming $d_{2,1}=1$ and µ corresponds to the smallest subcarrier spacing configuration between the subcarrier spacing configuration of the SRS, the PUCCH, or the PUSCH, or $\mu_r$, where $\mu_r$ corresponds to the subcarrier spacing configuration of the PRACH if it is 15 kHz or higher (e.g., otherwise, $\mu_r=0$), the UE 115-*a* may cancel the PUCCH, the PUSCH or the PRACH transmission in the remaining subbands from the set of subbands, and the UE 115-*a* may cancel the SRS transmission in remaining subbands from the subset of subbands.

In some examples, a collision may occur between an uplink signal and a downlink signal within an uplink TTI or a downlink TTI. In some cases, the collision may occur within flexible TTIs. For example, if a collision occurs at a set of subbands labeled as uplink, the UE 115-*a* may not be expected to receive a PDCCH, a PDSCH, or a CSI-RS. If a collision occurs at a set of subbands labeled as downlink, the UE 115-*a* may refrain from transmitting a PUSCH, a PUCCH, a PRACH, or an SRS. In some cases, for a set of subbands of a TTI (e.g., a set of symbols of a slot) that are indicated to the UE 115-*a* as uplink (e.g., by tdd-UL-DL-ConfigurationCommon or tdd-UL-DL-ConfigurationDedicated), the UE 115-*a* may fail to receive a PDCCH, a PDSCH, or a CSI-RS when the PDCCH, the PDSCH, or the CSI-RS overlap, even partially, with the set of subbands of the TTI. For a set of subbands of a TTI that are indicated to the UE 115-*a* as downlink (e.g., by tdd-UL-DL-ConfigurationCommon or tdd-UL-DL-ConfigurationDedicated), the UE 115-*a* may refrain from transmitting a PUSCH, a PUCCH, a PRACH, or an SRS when the PUSCH, the PUCCH, the PRACH, or the SRS overlaps, even partially, with the set of subbands of the TTI.

In full-duplex communications, collisions may occur between a downlink signal and an uplink signal within a flexible subband (e.g., a frequency range capable of supporting uplink and downlink communications) during the same TTI (e.g., a flexible slot) for a half-duplex UE (e.g., a UE 115-*a* that operates using half-duplex communications). In a full-duplex communications system, a subband may be fully uplink, fully downlink, flexible, or downlink and uplink (e.g., simultaneous downlink and uplink). A collision may occur between an uplink signal or channel and a downlink signal or channel between two semi-static configured uplink controls or signals and downlink controls or signals (e.g., a configured grant (CG) or semi-persistent scheduling (SPS)). For a half-duplex UE (e.g., the UE 115-*a*) unable to identify full-duplex communications or a UE 115-*a* capable of identifying full-duplex communications but not operating in a full-duplex mode, the collision may occur as some pre-configured signal or channel of some duplex mode may have different periodicities and, in some instances, may fall within a subband that is flexible or downlink and uplink simultaneously. The signal or channel may collide with some signal or channel that may have a different priority. In some cases, the pre-configured uplink signal or channel may include a CG PUSCH, an SR, a PUCCH for SPS, a PRACH for a secondary cell (Scell), a PUCCH for a P-CSI, or a PUCCH or PUSCH for an SP-CSI. In some cases, the pre-configured downlink signal may include a CSI-RS or a synchronization signal block (SSB).

A UE 115-a may be a half-duplex UE or a UE capable of identifying full-duplex communications. In some cases, an uplink signal and a downlink signal may be simultaneously scheduled at a flexible TTI or a full-duplex TTI (e.g., an uplink and downlink TTI). In some cases, there may be different scenarios of simultaneous semi-configured uplink signals and downlink signals in either a flexible TTI or a downlink plus uplink TTI (D+U). In some cases, the simultaneous uplink signal and downlink signal may occur at the same subband within the TTI, where the TTI format may be a downlink and flexible TTI (e.g., D+F) or an uplink and flexible TTI (e.g., U+F). In some cases, the uplink signal and the downlink signal may be non-overlapping, partially overlapping, or fully overlapping in frequency resources. In some cases, a half-duplex UE or a UE115-a capable of identifying full-duplex communications may be unable to resolve such a conflict.

As shown in the example of FIG. 2, the UE 115-a may communicate with a base station 105-a via a communications link 205-a. The UE 115-a may receive control signaling 210 from the base station 105-a via the communications link 205. The control signaling 210 may indicate a first semi-static configuration for the UE 115-a to transmit uplink signaling, and a second semi-static configuration for the UE 115-a receiving downlink signaling. In some examples, an RRC message may be used to configure the first semi-static configuration and the second semi-static configuration, where the RRC message may be a part of the control signaling 210 or in addition to the control signaling 210. In some cases, the UE 115-a may operate using half-duplex communications, and the UE 115-a may monitor for a collision (e.g., a transmission direction conflict) between the first semi-static configuration and the second semi-static configuration during a TTI. For example, the UE 115-a may monitor the communications link 205 for the collision 215 between the uplink signal 225-a (e.g., corresponding to the first semi-static configuration) and the downlink signal 230-a (e.g., corresponding to the second semi-static configuration) in a TTI 220. In some cases, the TTI 220 may be a flexible subband (e.g., an uplink subband or a downlink subband) or a full-duplex subband. The UE 115-a may communicate, according to a priority rule, one of an uplink signal 225-b in accordance with the first semi-static configuration or a downlink signal 230-b in accordance with the second semi-static configuration during the TTI 220 based on the monitoring. The UE 115-a may drop the other uplink signal 225-b or the downlink signal 230-b that the UE 115-a does not transmit or receive.

For example, the half-duplex UE (e.g., the UE 115-a) operating using half-duplex communications may be capable of collision handling within a flexible subband. For a half-duplex UE (e.g., the UE 115-a) operating in a full duplex network, when a conflict occurs between two semi-static uplink signals or channels and downlink signals or channels, the UE 115-a may drop one of the uplink signal (e.g., the uplink transmission) or the downlink signal (e.g., the downlink reception) based on a new priority rule. In some examples, the UE 115-a may first consider a signal or channel priority (e.g., higher priority transmission or reception vs. lower priority transmission or reception). The UE 115-a may then consider the signal or channel contents (e.g., a signal with higher priority data) such as a CSI report versus a PDSCH. In some cases, the UE 115-a may consider the time domain behavior of a signal. For example, an aperiodic signal may have a higher priority than a semi-persistent signal or a periodic signal, and a semi-persistent signal may have a higher priority than a periodic signal. The UE 115-a may also consider the number of overlapping subbands (e.g., overlapping symbols), and may drop a signal with a shorter number of subbands. In some cases, the priority rule may depend on a PUCCH format length. Additionally, or alternatively, the UE 115-a may consider the direction (e.g., downlink or uplink) in the subbands preceding the conflict as the UE 115-a may switch from downlink to uplink. For example, if the previous set of one or more subbands are downlink and the UE 115-a lacks enough time to switch to an uplink mode, the UE 115-a may remain in downlink mode and may ignore the uplink transmission.

Figure 3A:
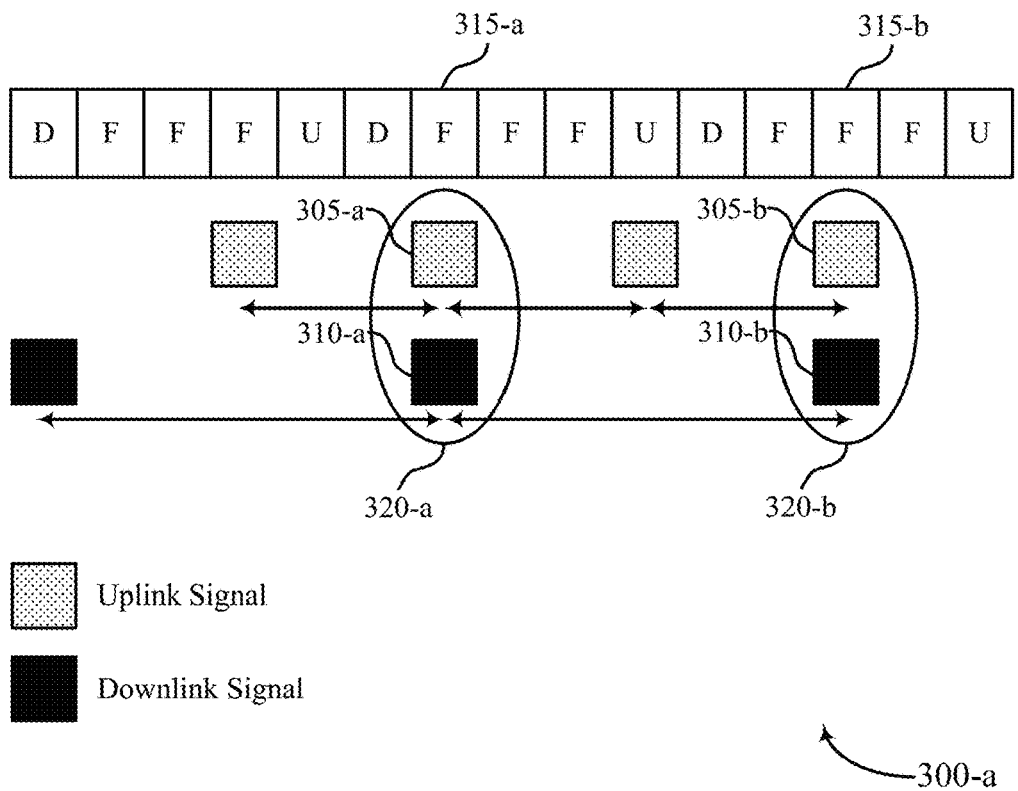
FIGS. 3A and 3B illustrate examples of collision schemes that support priority and collision handling techniques for wireless communications systems in accordance with aspects of the present disclosure.

FIG. 3A illustrates an example of a collision scheme 300-a that supports priority and collision handling techniques for wireless communications systems in accordance with aspects of the present disclosure. In some examples, the collision scheme 300-a may implement aspects of the wireless communications systems 100 and 200 or may be implemented by aspects of the wireless communications systems 100 and 200.

In some cases, a collision may occur between two semi-static configurations, such as a first semi-static configuration for transmitting uplink signaling and a second semi-static configuration for transmitting downlink signaling. In some cases, a half-duplex UE (e.g., a UE operating using half-duplex communications) may transmit uplink signals 305 to a base station and receive downlink signals 310 from the base station. For example, the uplink signals 305 may be configured as uplink CGs with a periodicity of three slots, and the downlink signals 310 may be configured as downlink SPS PDSCHs with a periodicity of six slots. In some cases, the UE and the base station may communicate the uplink signals 305 and the downlink signals 310 in a TTI including subbands 315 (e.g., symbols). The subbands 315 may be downlink subbands (e.g., D), uplink subbands (e.g., U), or flexible subbands (e.g., F). In the example shown in FIG. 3A, the subband configuration may include a repeated pattern of an uplink subband, followed by a downlink subband, and followed by three flexible subbands.

A collision may occur between an uplink signal 305 and a downlink signal 310 within the same subband 315 when the periodicities of the signals align. For example, a collision 320-a may occur between an uplink signal 305-a and a downlink signal 310-a in the flexible subband 315-a, and a collision 320-b may occur between an uplink signal 305-b and a downlink signal 310-b in the flexible subband 315-b. As described herein, the UE may use a priority rule to determine whether to transmit the uplink signal 305 or receive the downlink signal 310 in the subband 315 in which the collision occurred.

Figure 3B:
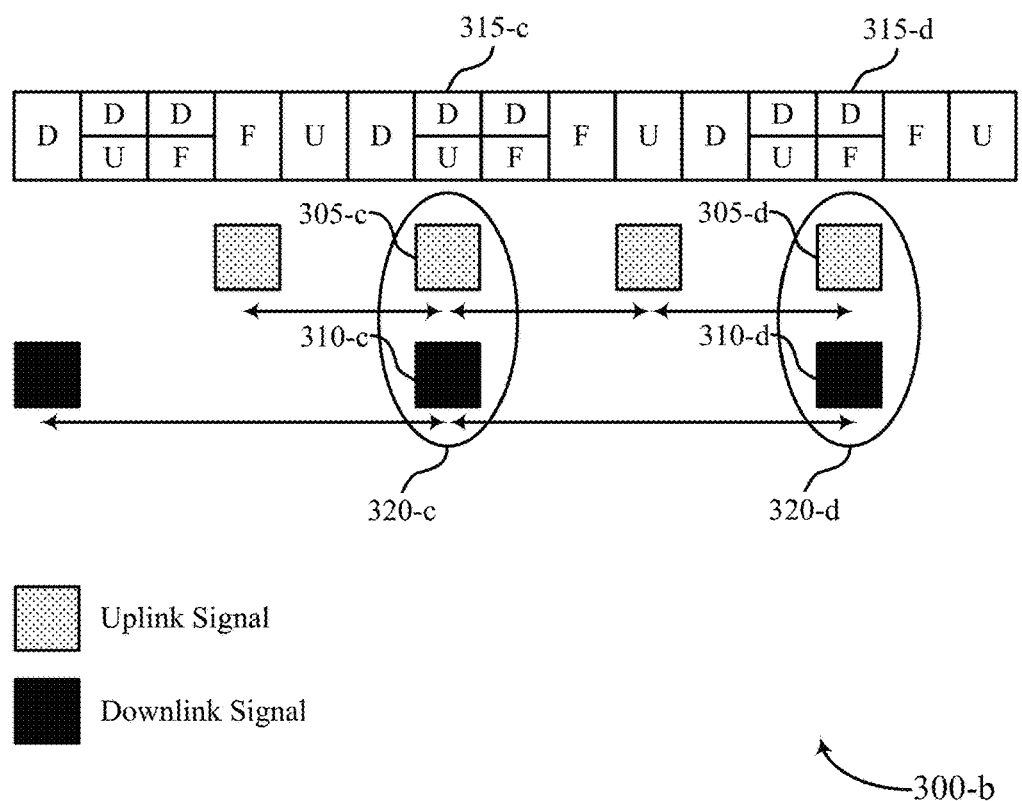

FIG. 3B illustrates an example of a collision scheme 300-b that supports priority and collision handling techniques for wireless communications systems in accordance with aspects of the present disclosure. In some examples, the collision scheme 300-b may implement aspects of the wireless communications systems 100 and 200 or may be implemented by aspects of the wireless communications systems 100 and 200.

In some cases, a collision may occur between two semi-static configurations, such as a first semi-static configuration for transmitting uplink signaling and a second semi-static configuration for transmitting downlink signaling. For example, a collision may occur at either flexible sets of subbands 315 (e.g., symbols) or at a set of full-duplex subbands 315 where the frequency may be separated between downlink subbands and uplink subbands such as downlink plus uplink subbands (e.g., D+U), downlink plus flexible subbands (e.g., D+F) or uplink plus flexible subbands (e.g., U+F).

In some cases, a UE capable of identifying full-duplex communications may transmit uplink signals 305 to a base station and receive downlink signals 310 from the base station. The UE may operate in a half-duplex mode for downlink reception and uplink transmission. In some cases, the uplink signals 305 may be configured as uplink CGs with a periodicity of three slots, and the downlink signals 310 may be configured as downlink SPS PDSCHs with a periodicity of six slots. The UE and the base station may communicate the uplink signals 305 and the downlink signals 310 in a TTI including the subbands 315. The subbands 315 may be downlink subbands (e.g., D), uplink subbands (e.g., U), flexible subbands (e.g., F), downlink plus uplink subbands (e.g., D+U), downlink plus flexible subbands (e.g., D+F) or uplink plus flexible subbands (e.g., U+F). In the example shown in FIG. 3B, the subband configuration may include a repeated pattern of a flexible subband, an uplink subband, a downlink subband, a downlink plus uplink subband, and a downlink plus flexible subband.

A collision may occur between an uplink signal 305 and a downlink signal 310 within the same subband 315 when the periodicities of the signals align. For example, a collision 320-c may occur between an uplink signal 305-c and a downlink signal 310-c in the downlink plus uplink subband 315-c, and a collision 320-d may occur between an uplink signal 305-d and a downlink signal 310-d in the downlink plus flexible subband 315-d. In some cases, a collision 320 may occur in a flexible subband 315. As described herein, the UE may use a priority rule to determine whether to transmit the uplink signal 305 or receive the downlink signal 310 in the subband 315 in which the collision occurred.

Figure 4:
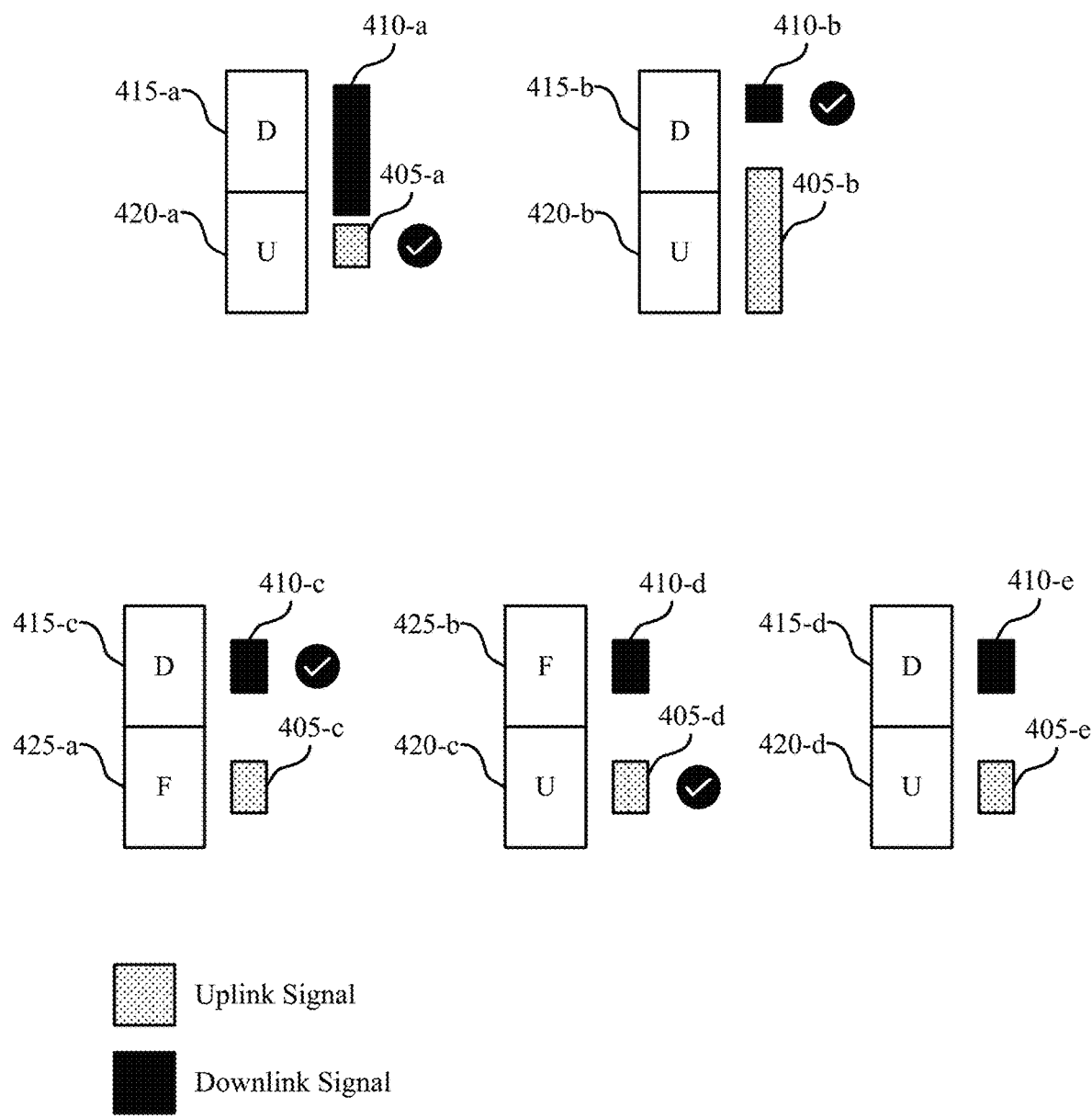
FIG. 4 illustrates an example of a priority scheme that supports priority and collision handling techniques for wireless communications systems in accordance with aspects of the present disclosure.

FIG. 4 illustrates an example of a priority scheme 400 that supports priority and collision handling techniques for wireless communications systems in accordance with aspects of the present disclosure. In some examples, the priority scheme 400 may implement aspects of the wireless communications systems 100 and 200 or may be implemented by aspects of the wireless communications systems 100 and 200.

In some examples, a collision may occur for a UE capable of identifying full-duplex communications within a full-duplex subband (e.g., a full-duplex slot). For example, the UE may operate using half-duplex communications, and the collision may occur between two semi-static configurations scheduled at a full-duplex subband (e.g., D+U, D+F, U+F), such as a first semi-static configuration for transmitting uplink signaling and a second semi-static configuration for transmitting downlink signaling. In addition to using the priority rules described with reference to FIG. 2, the UE may consider whether the first semi-static configuration for uplink signaling and the second semi-static configuration for downlink signaling overlap with defined downlink or uplink frequency resources within a subband. If there is a direction mismatch (e.g., a collision) between semi-statically configured uplink or downlink signaling with the frequency resources defined of the set of the subbands where the overlap is occurring, the UE may communicate one of the uplink signal or the downlink signal and drop the other.

In some cases, the UE may transmit uplink signals 405 to a base station and receive downlink signals 410 from the base station, where the base station may semi-statically configure the signals. The UE and the base station may communicate the uplink signals 405 and the downlink signals 410 in a TTI including subbands such as downlink subbands 415 (e.g., D), uplink subbands 420 (e.g., U), or flexible subbands 425 (e.g., F). In some examples, the UE may locate the frequency resources of an uplink signal 405-a and a downlink signal 410-a that are colliding and map the uplink signal 405-a and the downlink signal 410-a to the subband format of where the collision is happening (e.g., the UE may identify a respective subband format on which a respective signal is scheduled for the collision). For example, the UE may map the uplink signal 405-a to an uplink subband 420-a and the downlink signal 410-a to a downlink subband 415-a. In some cases, there may be a direction mismatch between the signaling and the subband format such that the downlink signal 410-a partially overlaps with the uplink subband 420-a. Before using the priority rules described herein, the UE may ignore (e.g., drop) the signal with the direction mismatch. That is, the UE may ignore the downlink signal 410-a because it is overlapping with the uplink subband 420-a, and may transmit the uplink signal 405-a which may be aligned in the correct direction (e.g., with the uplink subband 420-a).

In some examples, the UE may map the uplink signal 405-b to an uplink subband 420-b and the downlink signal 410-b to a downlink subband 415-b. There may be a direction mismatch between the signaling and the subband format such that the uplink signal 405-b partially overlaps with the downlink subband 415-b. Before using the priority rules described with reference to FIG. 3, the UE may ignore (e.g., drop) the signal with the direction mismatch. That is, the UE may ignore the uplink signal 405-b because it is overlapping with the downlink subband 415-b, and may transmit the downlink signal 410-a which may be aligned in the correct direction (e.g., with the downlink subband 415-b).

In some cases, during a collision between two semi-static configurations for uplink and downlink signaling scheduled at a full-duplex subband, the subband format may match the direction of the frequency resources of an uplink signal 405 and a downlink signal 410 (e.g., no mismatch). For example, a full-duplex subband may include a downlink subband 415-c and a flexible subband 425-a (e.g., a D+F subband). The UE may locate the frequency resources of an uplink signal 405-c and a downlink signal 410-c that are colliding, and map the uplink signal 405-c to the flexible subband 425-a and the downlink signal 410-c to the downlink subband 415-c (e.g., to the subband format corresponding to where the collision is occurring). If the frequency resources and the subband format lack a direction mismatch (e.g., if the uplink signal 405-c and the downlink signal 410-c overlap within their corresponding subbands), the UE may prioritize the downlink signal 410-c. That is, the UE may prioritize the downlink signal 410-c if the frequency resources corresponding to the downlink signal 410-c fully overlap within the downlink subband 415-c in the D+F subband. As such, the UE may prioritize the signal which has a direction that is pre-configured in its corresponding subband.

In some examples, a full-duplex subband may include a flexible subband 425-b and an uplink subband 420-c (e.g., a U+F subband). The UE may locate the frequency resources of an uplink signal 405-d and a downlink signal 410-d that are colliding and map the uplink signal 405-d to the uplink subband 420-c and the downlink signal 410-d to the flexible subband 425-b. If the frequency resources and the subband format lack a direction mismatch (e.g., if the uplink signal 405-d and the downlink signal 410-d overlap within their corresponding subbands), the UE may prioritize the uplink signal 405-d. That is, the UE may prioritize the uplink signal 405-d if the frequency resources corresponding to the uplink signal 405-d fully overlap within the uplink subband in the U+F subband. As such, the UE may prioritize the signal which has a direction that is pre-configured in its corresponding subband.

In some cases, the UE may locate the frequency resources of an uplink signal 405-e and a downlink signal 410-e that are colliding, and the UE may map the uplink signal 405-e to an uplink subband 420-d and the downlink signal 410-e to a downlink subband 415-d. If the frequency resources and the subband format lack a direction mismatch (e.g., if the uplink signal 405-e and the downlink signal 410-e overlap within their corresponding subbands), the UE may follow one or more of the priority schemes described herein to prioritize the uplink signal 405-e or the downlink signal 410-e. For example, the UE may communicate (e.g., prioritize) communicate a higher priority signal, a signal with higher priority data, a signal with higher priority time domain behavior, a signal with a greater quantity of symbols, a signal in a same or different direction from the direction of the symbols preceding the conflict, or any combination thereof.

Figure 5:
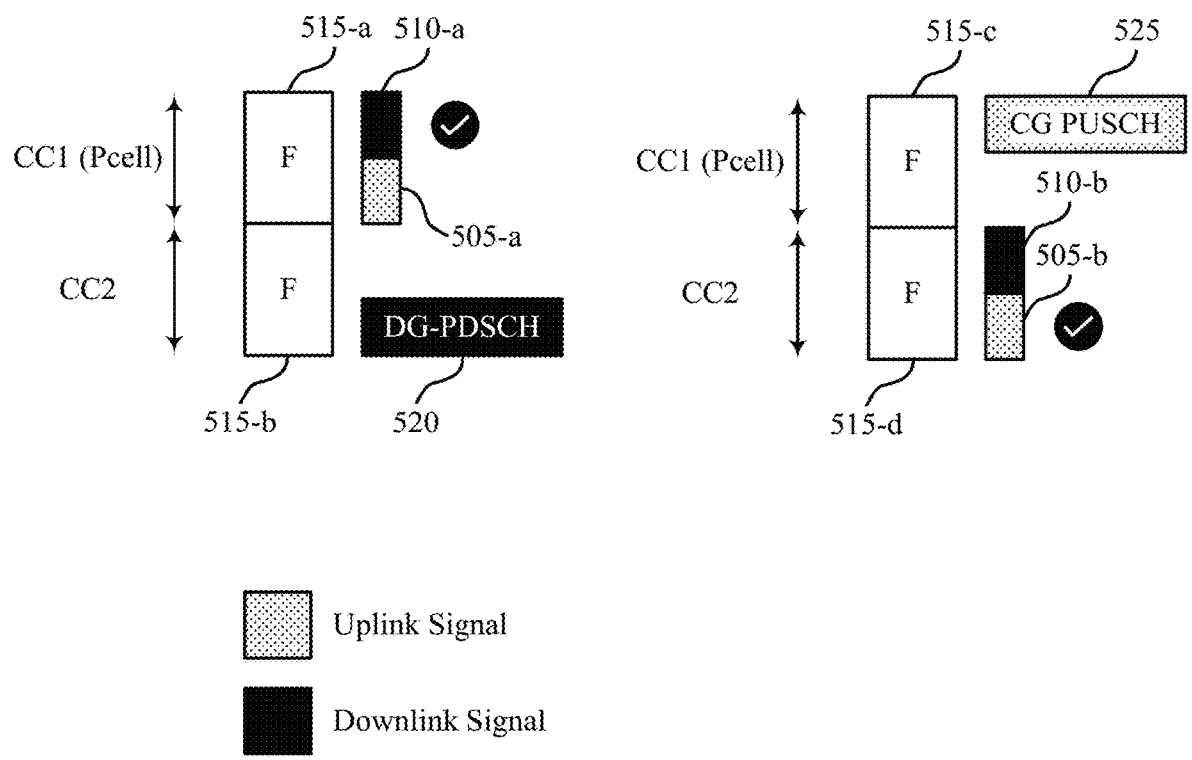
FIG. 5 illustrates an example of a priority scheme that supports priority and collision handling techniques for wireless communications systems in accordance with aspects of the present disclosure.

FIG. 5 illustrates an example of a priority scheme 500 that supports priority and collision handling techniques for wireless communications systems in accordance with aspects of the present disclosure. In some examples, the priority scheme 500 may implement aspects of the wireless communications systems 100 and 200 or may be implemented by aspects of the wireless communications systems 100 and 200.

In some examples, a collision may occur between a first semi-static configuration for transmitting uplink signaling and a second semi-static configuration for transmitting downlink signaling scheduled at a flexible subband (e.g., a frequency range capable of supporting uplink and downlink communications) during the same TTI (e.g., a flexible slot). In some cases, a UE may be configured to perform carrier aggregation (CA) between two CCs in the same band. When a half-duplex UE (e.g., a UE operating using half-duplex communications) is configured with intra-band CA, the UE may use the same subband format across the CCs in the subband to align the communication direction of the UE. For example, the CCs may each follow a downlink subband format (e.g., D), an uplink subband format (e.g., U), or a flexible subband format (e.g., F).

In some cases, the UE may support communications in multiple CCs. For example, the UE may communicate signaling in a CC1 (e.g., a primary cell (Pcell) CC) using the flexible subband 515-a and the UE may communicate other signaling in a CC2 using the flexible subband 515-b. For a half-duplex UE operating in a full-duplex network with intra-band CA, a collision may occur between two semi-statically configured uplink and downlink signals or channels in a CC. For example, a collision may occur between an uplink signal 505-a and a downlink signal 510-a in the CC1 corresponding to the flexible subband 515-a, while the CC2 corresponding to the flexible subband 515-b may experience no collision. In some cases, the UE may drop one of the uplink signal 505-a or the downlink signal 510-a to align the direction mode (e.g., uplink or downlink) with the CC2 (e.g., the other CCs). That is, the UE may consider the direction mode of the CC2 corresponding to the flexible subband 515-b (e.g., the neighboring CC) without a conflict and align the direction of the CC1 corresponding to the flexible subband 515-a experiencing the collision with the CC2 before using the priority rules described with reference to FIG. 3.

In some cases, a collision may occur at the CC1 corresponding to the flexible subband 515-a while the CC2 corresponding to the flexible subband 515-b may be dynamically scheduled (e.g., by DCI) for either an uplink transmission or a downlink transmission. The UE may communicate either the uplink transmission or the downlink transmission by following the same direction of the flexible subband 515-b. For example, the collision may occur between the uplink signal 505-a and the downlink signal 510-a in the flexible subband 515-a, where the uplink signal 505-a and the downlink signal 510-a may be semi-statically configured. The flexible subband 515-b may be configured for a DG PDSCH 520. The UE may prioritize the direction of the dynamically configured signal (e.g., the DG PDSCH 520) over the direction of the semi-statically configured signal (e.g., the uplink signal 505-a or the downlink signal 510-a), and therefore may receive the downlink signal 510-a as the downlink signal 510-a is in the same direction of the DG PDSCH 520 (e.g., the downlink direction). In some examples, if a collision occurs at more than one CC, the UE may first handle the collision on the Pcell (e.g., the CC1) or a special cell (SPcell) (e.g., which may include a Pcell and a primary secondary cell. If there is more than one CC (e.g., five CCs) and a collision occurs in one or two of the CCs, then the UE may follow a majority rule to determine which direction (e.g., uplink or downlink) to prioritize based on whether uplink or downlink is more prevalent among the CCs. For example, the UE may determine that a majority of the CCs or a threshold quantity of CCs include a first direction (e.g., uplink or downlink), and the UE may select the signal with the first direction in a conflict based on the majority or threshold quantity of CCs having communications in the first direction.

In some examples, a collision may occur between an uplink signal 505-b and a downlink signal 510-b in a CC2 corresponding to a flexible subband 515-d, where the uplink signal 505-b and the downlink signal 510-b may be semi-statically configured. A CC1 (e.g., a Pcell) corresponding to a flexible subband 515-c may experience no collision. In some cases, the flexible subband 515-c may be configured (e.g., dynamically or semi-statically) for a CG PUSCH 525. Since the flexible subband 515-d is semi-statically configured for uplink transmissions or downlink transmissions, and as the flexible subband 515-d is an Scell, the UE may follow the semi-static traffic direction of the Pcell (e.g., or a SPcell). As such, the UE may transmit the uplink signal 505-b, as the uplink signal 505-b is in the same direction as the Pcell which is semi-statically configured for the CG PUSCH 525 in the flexible subband 515-c (e.g., the uplink direction).

Figure 6:
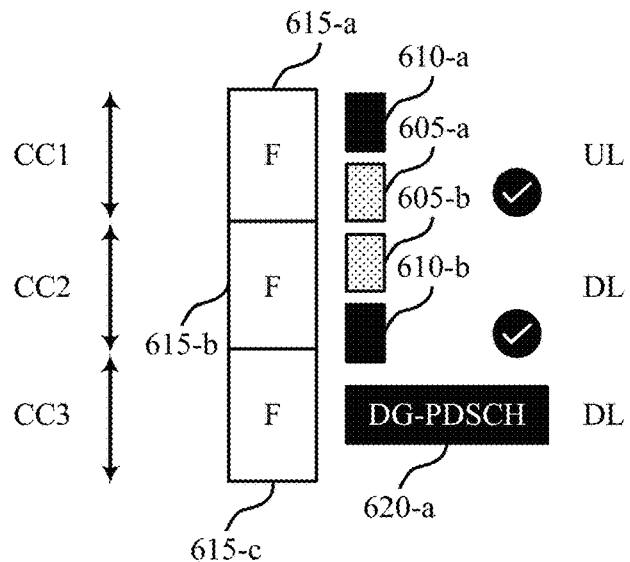
FIG. 6 illustrates an example of a priority scheme that supports priority and collision handling techniques for wireless communications systems in accordance with aspects of the present disclosure.
Figure 6:
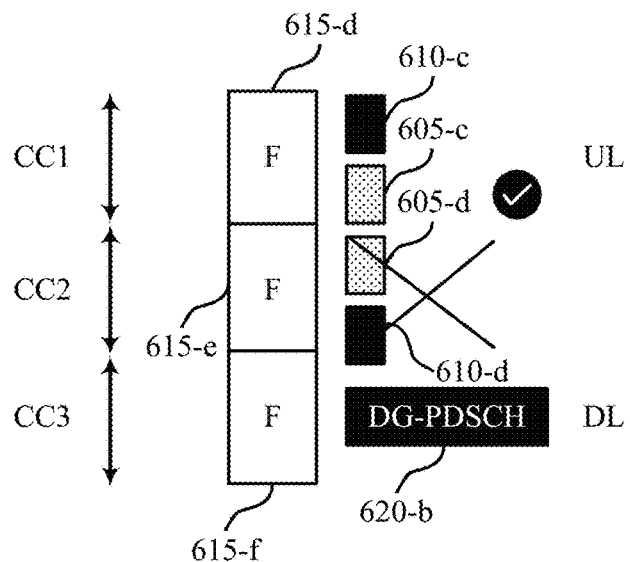

FIG. 6 illustrates an example of a priority scheme 600 that supports priority and collision handling techniques for wireless communications systems in accordance with aspects of the present disclosure. In some examples, the priority scheme 600 may implement aspects of the wireless communications systems 100 and 200 or may be implemented by aspects of the wireless communications systems 100 and 200.

In some examples, a collision may occur between a first semi-static configuration for transmitting uplink signaling and a second semi-static configuration for transmitting downlink signaling scheduled at a flexible subband (e.g., a frequency range capable of supporting uplink and downlink communications) during the same TTI (e.g., a flexible slot). In some cases, a UE may be configured to perform CA between two CCs in the same band. When a half-duplex UE (e.g., a UE operating using half-duplex communications) is configured with intra-band CA, the UE may use the same subband format across the CCs in the subband to align the communication direction of the UE. For example, the CCs may each follow a downlink subband format (e.g., D), an uplink subband format (e.g., U), or a flexible subband format (e.g., F).

In some cases, a set CCs may each operate in a flexible subband 615. For example, a CC1 (e.g., a Pcell) may operate in a flexible subband 615-a, a CC2 may operate in a flexible subband 615-b, and a CC3 may operate in a flexible subband 615-c. For a half-duplex UE operating in a full-duplex network with intra-band CA, one or more collisions may occur between semi-statically configured uplink and downlink signals or channels in a CC. For example, a collision may occur between an uplink signal 605-a and a downlink signal 610-a in the CC1 corresponding to the flexible subband 615-a, and another collision may occur between an uplink signal 605-b and a downlink signal 610-b in the CC2 corresponding to the flexible subband 615-b. In some cases, the CC3 corresponding to the flexible subband 615-c may experience no collision, and may instead be dynamically configured for a DG PDSCH 620-a.

If collisions between the uplink signals 605 and the downlink signals 610 occur in more than one flexible subband 615, the UE may consider dropping an uplink signal 605 or a downlink signal 610 such that self-interference is reduced or minimized (e.g., as an alternative to aligning the same direction along all CCs as described with reference to FIG. 5). As the UE operates using half-duplex communications, the UE may communicate using different uplink and downlink directions if there is a large enough gap between an uplink transmission and a downlink transmission. For example, the UE may prioritize and transmit the uplink signal 605-a in the flexible subband 615-a (e.g., and drop the downlink signal 610-a), and the UE may then prioritize and transmit the downlink signal 610-b in the flexible subband 615-d (e.g., and drop the uplink signal 605-b) because the uplink signal 605-a and the downlink signal 610-b are separated by a large enough gap (e.g., half of the flexible subband 615-b).

In some examples, a CC1 may operate in a flexible subband 615-d, a CC2 may operate in a flexible subband 615-e, and a CC3 may operate in a flexible subband 615-f. For a half-duplex UE operating in a full-duplex network with intra-band CA, one or more collisions may occur between semi-statically configured uplink and downlink signals or channels in a CC. For example, a collision may occur between an uplink signal 605-c and a downlink signal 610-c in the CC1 corresponding to the flexible subband 615-d, and another collision may occur between an uplink signal 605-d and a downlink signal 610-d in the CC2 corresponding to the flexible subband 615-e. In some cases, CC3 corresponding to the flexible subband 615-f may experience no collision, and may instead be dynamically configured for a DG PDSCH 620-b.

If collisions between the uplink signals 605 and the downlink signals 610 occur in more than one flexible subband 615, the UE may consider dropping an uplink signal 605 or a downlink signal 610 such that self-interference is minimized (e.g., as an alternative to aligning the same direction along all CCs as described with reference to FIG. 5). In some cases, the UE may prioritize and transmit the uplink signal 605-c (e.g., and drop the downlink signal 610-c) in the flexible subband 615-d (e.g., the CC1) and may drop both the uplink signal 605-d and the downlink signal 610-d in the flexible subband 615-e (e.g., the CC2) to allow for a greater separation gap between the uplink signal 605-c and the DG PDSCH 620-b, therefore reducing self-interference.

Figure 7:
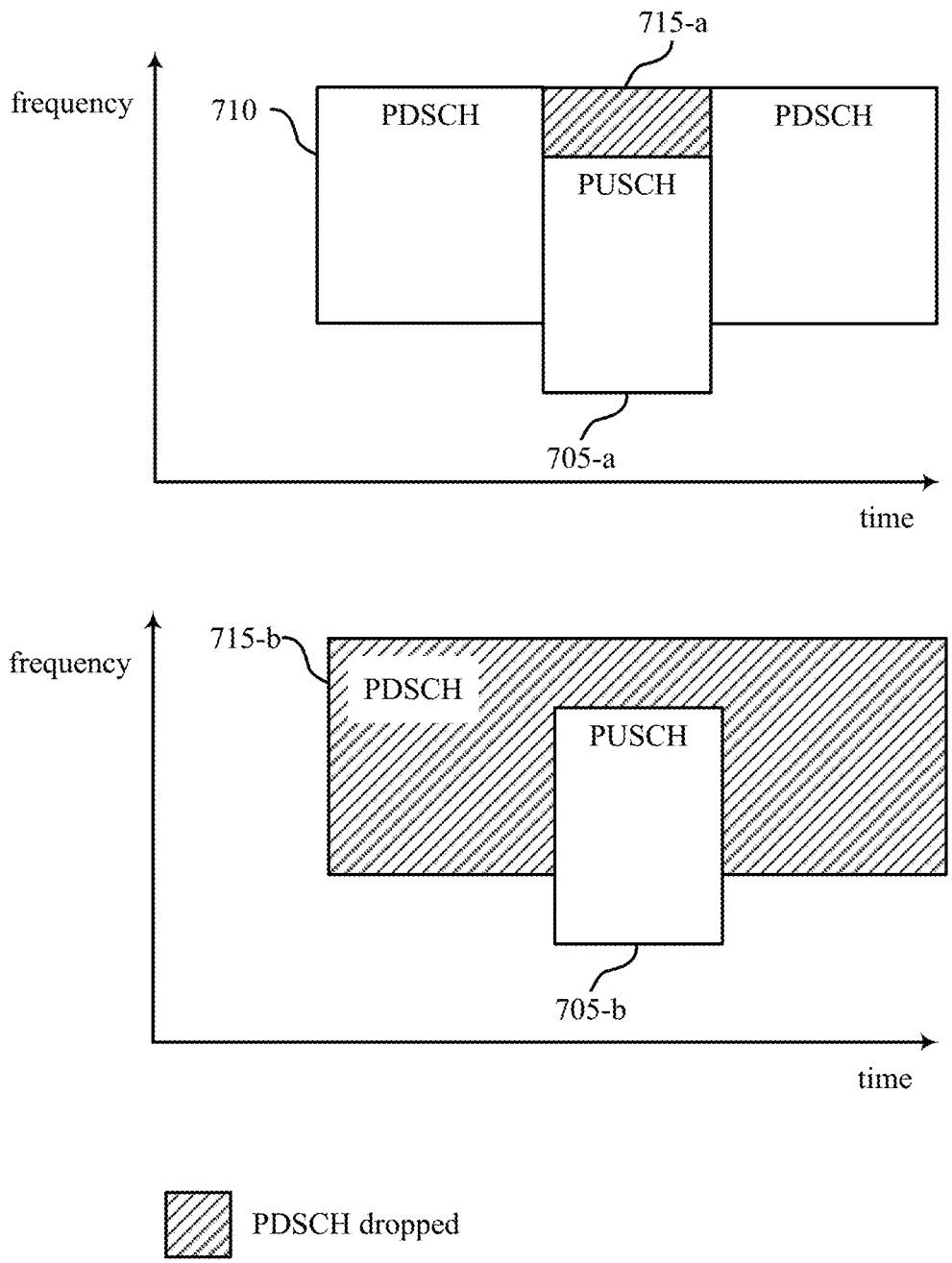
FIG. 7 illustrates an example of a priority scheme that supports priority and collision handling techniques for wireless communications systems in accordance with aspects of the present disclosure.

FIG. 7 illustrates an example of a priority scheme 700 that supports priority and collision handling techniques for wireless communications systems in accordance with aspects of the present disclosure. In some examples, the priority scheme 600 700 may implement aspects of the wireless communications systems 100 and 200 or may be implemented by aspects of the wireless communications systems 100 and 200.

In some cases, a collision may occur between two semi-statically configured uplink and downlink signals or channels in a subband, and a UE may use a priority rule to determine whether to communicate an uplink signal or a downlink signal and drop the other signal. In some cases, the UE may drop the signal or channel not prioritized (e.g., the signal in the other downlink or uplink direction) partially or fully. For example, the UE may receive a PDSCH 710 and a PUSCH 705-a, where the PDSCH 710 may utilize more frequency resources (e.g., in the downlink direction) than the PUSCH 705-a (e.g., in the uplink direction). The UE may determine that the PUSCH 705-a has a higher priority than the PDSCH 710, and therefore may transmit the PUSCH 705-a and drop the PDSCH 715-a, which may be a portion of the PDSCH 710 that overlapped with the PUSCH 705-a. Alternatively, the UE may prioritize and transmit a PUSCH 705-b and may fully drop a PDSCH 715-b based on a portion of the frequency resources for the PDSCH 715-b overlapping with the frequency resources for the PUSCH 705-b. In some cases, whether the UE partially or fully drops an uplink or downlink signal may depend on a UE capability to keep phase coherency. For example, if a UE maintains phase coherency while switching uplink or downlink directions, the UE may partially drop a signal, otherwise the UE may fully drop a signal.

Figure 8:
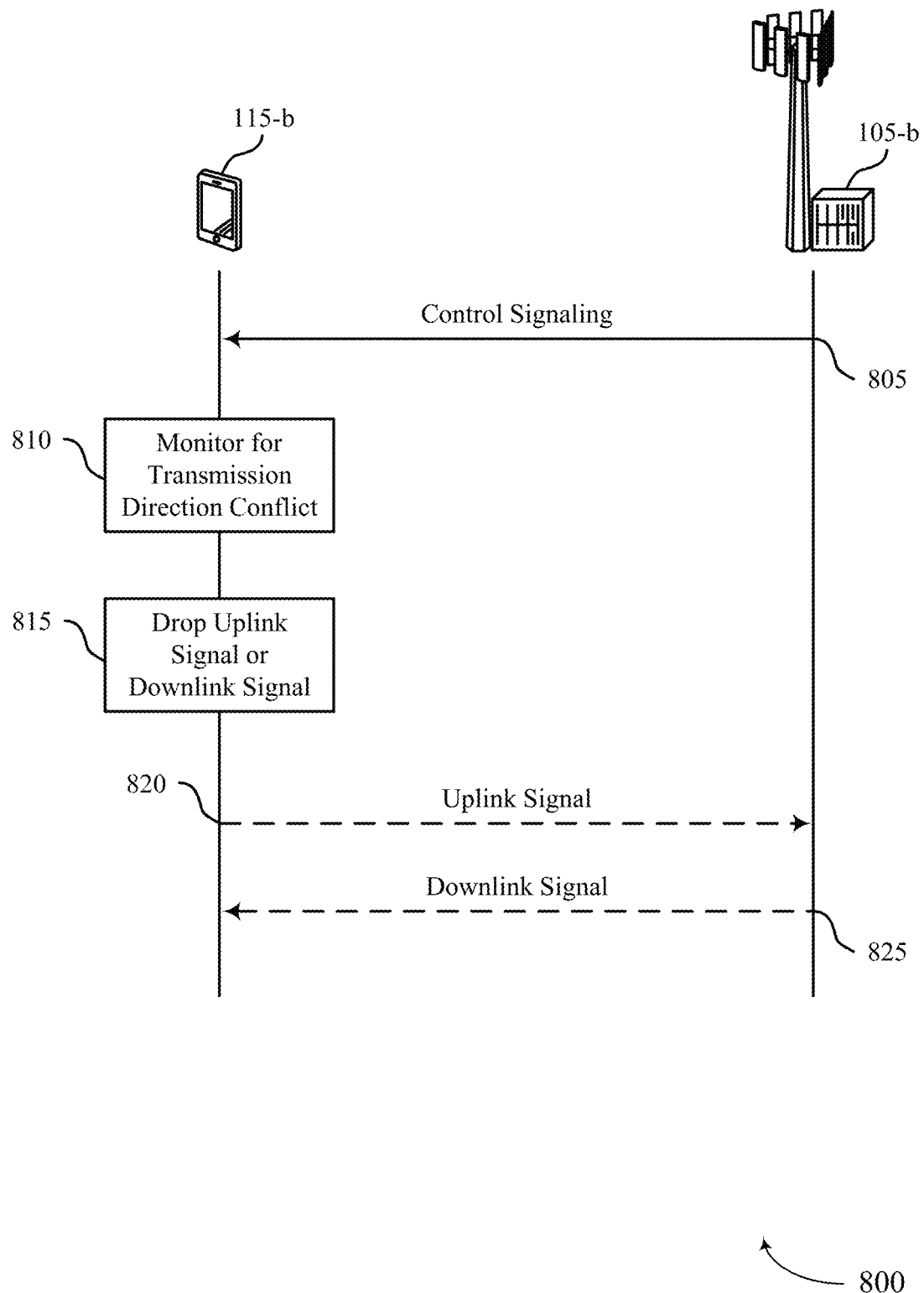
FIG. 8 illustrates an example of a process flow that supports priority and collision handling techniques for wireless communications systems in accordance with aspects of the present disclosure.

FIG. 8 illustrates an example of a process flow 800 that supports priority and collision handling techniques for wireless communications systems in accordance with aspects of the present disclosure. The process flow 800 may implement aspects of wireless communications systems 100 and 200, or may be implemented by aspects of the wireless communications system 100 and 200. For example, the process flow 800 may illustrate operations between a UE 115-b and a base station 105-b, which may be examples of corresponding devices described with reference to FIGS. 1 and 2. In the following description of the process flow 800, the operations between the UE 115-b and the base station 105-b may be transmitted in a different order than the example order shown, or the operations performed by the UE 115-b and the base station 105-b may be performed in different orders or at different times. Some operations may also be omitted from the process flow 800, and other operations may be added to the process flow 800.

At 805, the UE 115-*b* may receive, from the base station 105-*b*, control signaling indicating a first semi-static configuration for transmitting uplink signaling and a second semi-static configuration for transmitting downlink signaling. For example, the UE 115-*b* may receive RRC signaling or other control signaling indicating the configurations from the base station 105-*b*.

At 810, the UE 115-*b* operating using half-duplex communications (e.g., a half-duplex UE) may monitor for a transmission direction conflict between the first semi-static configuration and the second semi-static configuration during a TTI. For example, the UE 115-*b* may monitor for a collision between an uplink signal and a downlink signal in a flexible subband (e.g., a frequency range capable of supporting uplink and downlink communications) during the same TTI (e.g., a flexible slot) or a full-duplex subband (e.g., a full-duplex slot). In some cases, the transmission direction conflict may occur if there is a direction mismatch between frequency resources of the uplink signal and the downlink signal and the subband format where the collision is occurring.

At 815 the UE 115-*b* may drop the uplink signal or the downlink signal based on a priority rule indicating to drop the uplink signal or the downlink signal. In some cases, the UE 115-*b* may drop the signal that the UE 115-*b* may have refrained from communicating at 820 or at 825. In some cases, the UE 115-*b* may partially or fully drop the uplink signal or the downlink signal according to a capability of the UE 115-*b* as described herein, for example, with reference to FIG. 7.

At 820, the UE 115-*b* may communicate, to the base station 105-*b* and according to a priority rule, an uplink signal in accordance with the first semi-static configuration during the TTI based on the monitoring. Additionally, or alternatively, at 825, the UE 115-*b* may communicate, with the base station 105-*b* and according to a priority rule, a downlink signal in accordance with the second semi-static configuration during the TTI based on the monitoring. For example, the UE 115-*b* may communicate a higher priority signal, a signal with higher priority data, a signal with higher priority time domain behavior, a signal with a greater quantity of symbols, a signal in a same or different direction from the direction of the symbols preceding the conflict, or any combination thereof. In some cases, the priority rule may differ depending on whether the UE 115-*b* operates using half-duplex communications or is capable of identifying full-duplex communications, and whether the transmission direction conflict occurs in a flexible subband or a full-duplex subband.

Thus, the UE 115-*b* may communicate or drop signals in accordance with one or more priority schemes or rules based on identifying the transmission direction conflict (e.g., overlapping signals, signals scheduled for a same subband for a same TTI, and the like) as described herein with reference to FIGS. 1-7. The UE 115-*b* may implement any order or combination of priority rules. For example, the UE 115-*b* may first communicate (e.g., transmit or receive) a higher priority signal. If neither signal has a higher priority (e.g., the signals have a same or similar priority), the UE 115-*b* may identify whether a signal includes higher priority data (e.g., a signal corresponding to higher priority signal or channel contents). If neither contents have a higher priority, then the UE 115-*b* may consider the priority of time domain behavior of a signal. For example, the UE 115-*b* may communicate an aperiodic signal based on the priority rule indicating that the aperiodic signal corresponds to a higher priority than a signal with periodic behavior, among other examples of priorities and time domain behaviors.

In some cases, if neither signal has a higher priority time domain behavior, the UE 115-*b* may consider the quantity of symbols of a signal. For example, the UE 115-*b* may communicate a signal with a higher quantity of overlapping symbols or depending on an uplink control channel format length. If the signals have the same quantity of overlapping symbols or the same uplink control channel format length, then the UE may consider the direction of the symbols preceding the conflict. For example, the UE 115-*b* may determine whether a quantity of symbols between a last symbol for a downlink communication prior to the conflict and a first symbol of an uplink signal of the conflict satisfies a threshold duration (e.g., the UE may determine whether a capability of the UE supports switching from downlink to uplink in the quantity of symbols). If the threshold is satisfied, the UE may refer to other priority rules to select a signal for communication. If the threshold is not satisfied (e.g., the UE does not have enough time to switch to uplink), the UE may maintain a downlink mode and select the downlink signal for reception (e.g., the UE may drop the uplink signal based on the threshold not being satisfied).

In some examples, the UE 115-*b* may be capable of identifying full-duplex communications but not operating in a full-duplex mode (e.g., the UE 115-*b* may operate in a half-duplex mode in a full-duplex system). The UE 115-*b* may communicate or drop signals in accordance with one or more priority schemes or rules based on identifying overlapping signals as described herein with reference to FIGS. 1-7. For example, the UE 115-*b* may first consider whether the signals overlap in corresponding uplink or downlink frequency resources. If there is a direction mismatch between the frequency resources of the signals and the subband formats of the full-duplex subband where the overlap is identified, the UE 115-*b* may communicate one of the uplink signal or the downlink signal and drop the other signal based on the one or more priority rules indicating which signal to communicate or drop. If there is no direction mismatch, the UE 115-*b* may then give priority to a signal which overlaps with its corresponding subband format in a full-duplex TTI (e.g., the UE 115-*b* may give higher priority to an uplink signal in an uplink subband than a downlink signal in a flexible subband). If the full-duplex TTI includes and uplink subband and a downlink subband (e.g., lacks a flexible subband) and an uplink signal and a downlink signal overlap with the uplink subband and the downlink subband respectively, then the UE 115-*b* may give higher priority to a signal based on the priority rules described with reference to FIG. 2.

In some examples, the UE 115-*b* may be operating using half-duplex communications in a full-duplex system. The UE 115-*b* may first prioritize an uplink signal or a downlink signal based on a first signal on a first CC in a same direction as a second signal on a second CC based on the transmission direction conflict occurring in the first CC. Otherwise, the UE 115-*b* may give higher priority to a signal based on the priority rules described with reference to FIG. 2. While at 820, 825, or both the UE 115-*b* is described as referring to various priority rules in an exemplary order, it is to be understood that any combination of rules, order of rules, and the like may be used.

Figure 9:
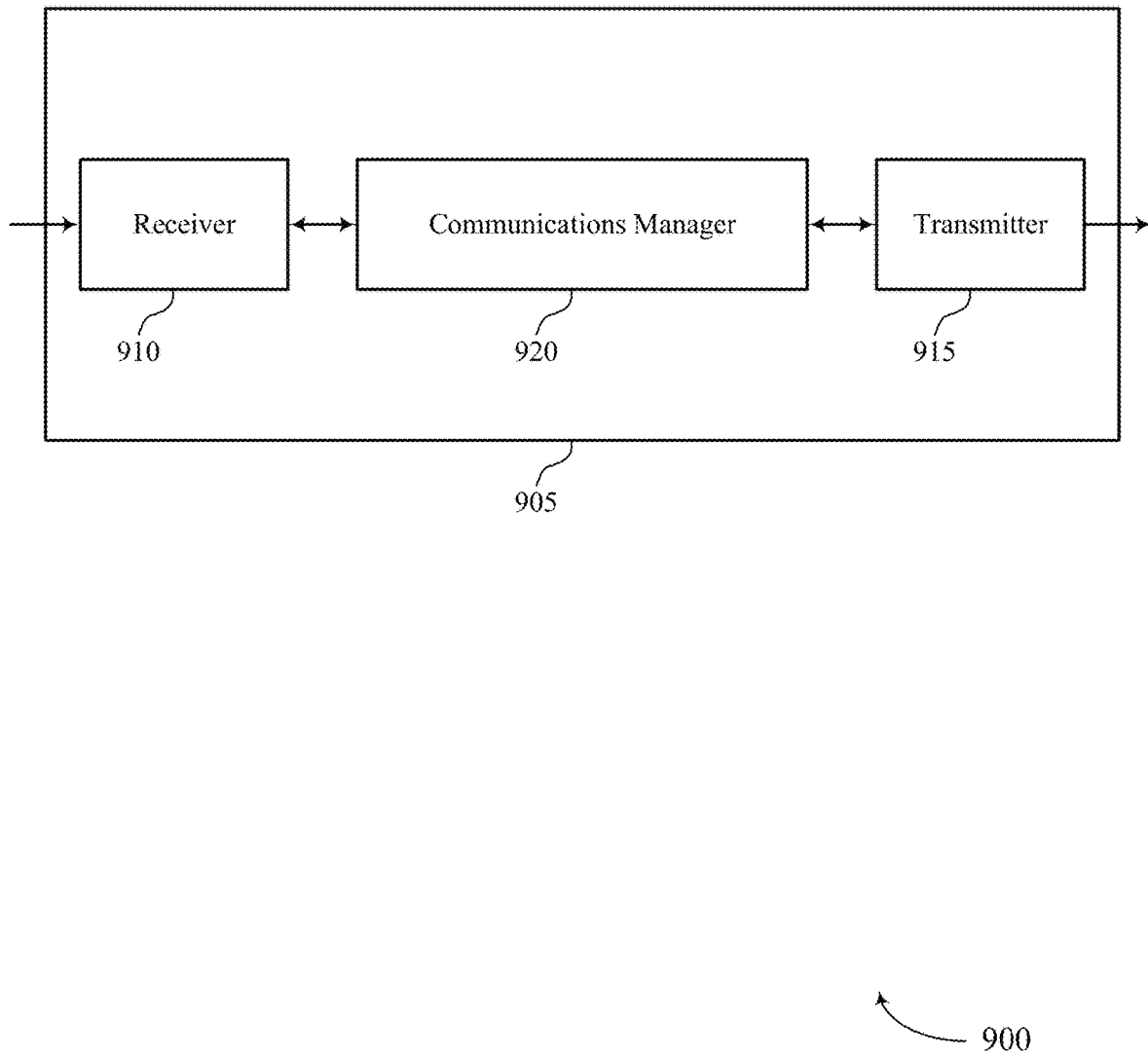
FIGS. 9 and 10 show block diagrams of devices that support priority and collision handling techniques for wireless communications systems in accordance with aspects of the present disclosure.

FIG. 9 shows a block diagram 900 of a device 905 that supports priority and collision handling techniques for wireless communications systems in accordance with aspects of the present disclosure. The device 905 may be an example of aspects of a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to priority and collision handling techniques for wireless communications systems). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to priority and collision handling techniques for wireless communications systems). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of priority and collision handling techniques for wireless communications systems as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving control signaling indicating a first semi-static configuration for transmitting uplink signaling and a second semi-static configuration for receiving downlink signaling. The communications manager 920 may be configured as or otherwise support a means for monitoring, by the UE operating using half-duplex communication, for a transmission direction conflict between the first semi-static configuration and the second semi-static configuration during a TTI. The communications manager 920 may be configured as or otherwise support a means for communicating, according to a priority rule, one of an uplink signal in accordance with the first semi-static configuration or a downlink signal in accordance with the second semi-static configuration during the TTI based on the monitoring.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for priority and collision handling for wireless communications systems, which may reduce power consumption and latency at the device 905. As such, supported techniques may include improved network operations, and, in some examples, may promote network efficiencies, among other benefits.

Figure 10:
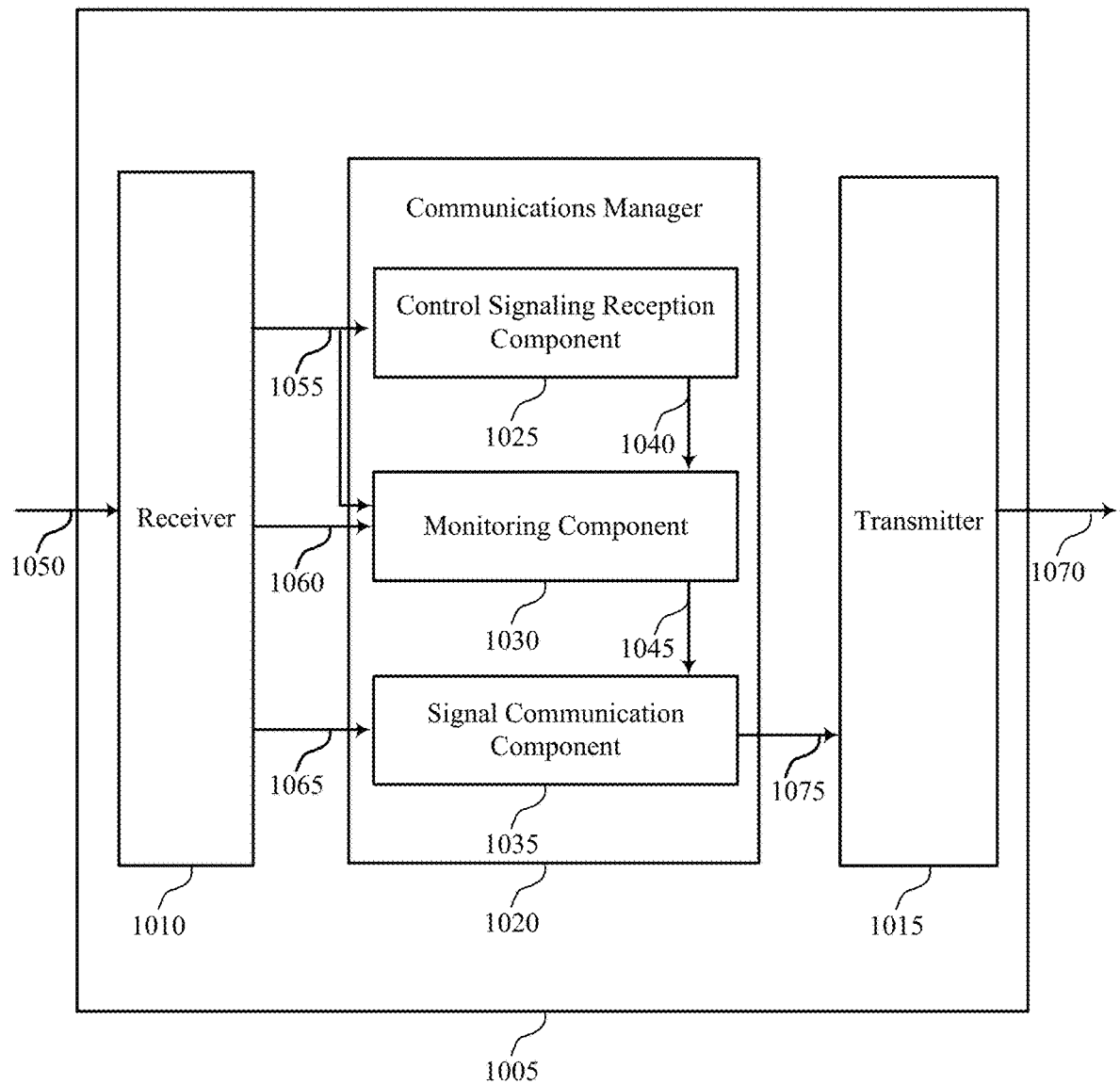

FIG. 10 shows a block diagram 1000 of a device 1005 that supports priority and collision handling techniques for wireless communications systems in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to priority and collision handling techniques for wireless communications systems). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to priority and collision handling techniques for wireless communications systems). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of priority and collision handling techniques for wireless communications systems as described herein. For example, the communications manager 1020 may include a control signaling reception component 1025, a monitoring component 1030, a signal communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The receiver 1010 may receive signaling 1050. For example, the receiver 1010 may receive control signaling, data signaling, or a combination thereof from other devices (e.g., a base station). The receiver may electrically send information of the signaling 1050 to other components in the device 1005. For example, the receiver may send configuration information to the control signaling reception component 1025. As an illustrative example, the receiver 1010 may receive signaling 1050 indicating one or more configurations (e.g., indicating a set of semi-static configurations) and the receiver 1010 may send the configuration signaling 1055 to the control signaling reception component 1025. Additionally or alternatively, the receiver 1010 may send the semi-static configuration information 1060 to the monitoring component 1030 (or the control signaling reception component 1025 may send such information to the monitoring component 1030, such as configuration indication 1040). In some examples, the receiver may receive signaling 1050 that is a downlink message (e.g., the device 1005 may determine to receive a downlink message and drop an uplink message in accordance with a priority rule). In such examples, the receiver may send downlink information 1065 to the signal communication component 1035.

The communications manager 1020 may support wireless communications at a UE in accordance with examples as disclosed herein. The control signaling reception component 1025 may be configured as or otherwise support a means for receiving control signaling indicating a first semi-static configuration for transmitting uplink signaling and a second semi-static configuration for receiving downlink signaling. The control signaling reception component 1025 may send a configuration indication 1040 to the monitoring component 1030. The monitoring component 1030 may be configured as or otherwise support a means for monitoring, by the UE operating using half-duplex communication, for a transmission direction conflict between the first semi-static configuration and the second semi-static configuration during a TTI. The monitoring component 1030 may use the configuration indication 1040 to monitor for the first semi-static configuration and the second semi-static configuration. The monitoring component 1030 may send a conflict signal 1045 to the signal communication component 1035. The signal communication component 1035 may use the conflict signal 1045 to prioritize the first semi-static configuration or the second semi-static configuration. The signal communication component 1035 may be configured as or otherwise support a means for communicating, according to a priority rule, one of an uplink signal in accordance with the first semi-static configuration or a downlink signal in accordance with the second semi-static configuration during the TTI based on the monitoring.

The transmitter 1015 may transmit uplink signaling 1070. For example, the transmitter 1015 may transmit control signaling, data signaling, or a combination thereof to other devices (e.g., a base station). The transmitter 1015 may electrically receive information of the uplink signaling 1070 from other components in the device 1005. For example, the transmitter 1015 may receive uplink information 1075 (e.g., information of an uplink message) from the signal communication component 1035 (e.g., the device 1005 may determine to transmit an uplink message and drop a downlink message in accordance with a priority rule). In such examples, the transmitter 1015 may send uplink signaling 1070.

Figure 11:
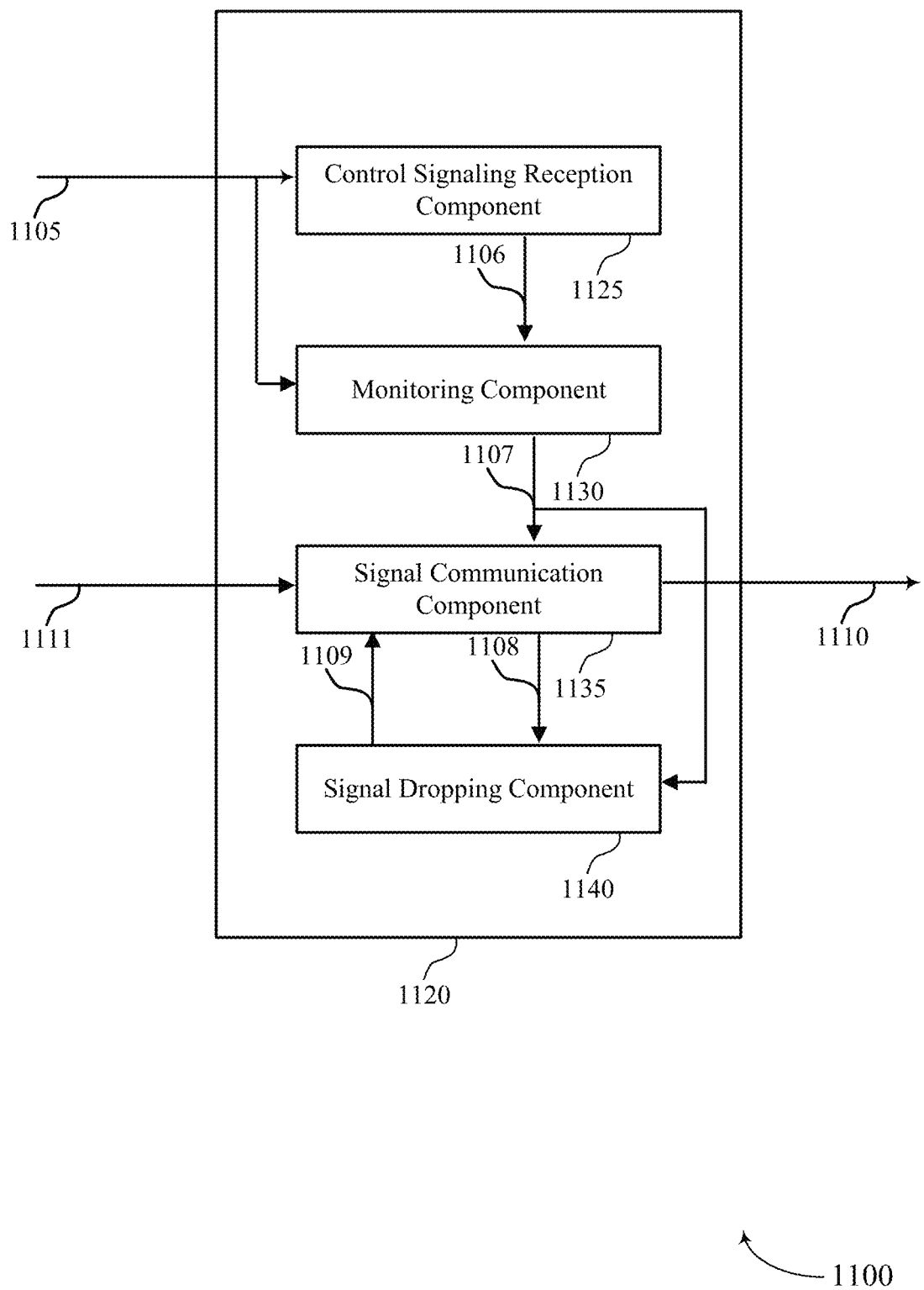
FIG. 11 shows a block diagram of a communications manager that supports priority and collision handling techniques for wireless communications systems in accordance with aspects of the present disclosure.

FIG. 11 shows a block diagram 1100 of a communications manager 1120 that supports priority and collision handling techniques for wireless communications systems in accordance with aspects of the present disclosure. The communications manager 1120 may be an example of aspects of a communications manager 920, a communications manager 1020, or both, as described herein. The communications manager 1120, or various components thereof, may be an example of means for performing various aspects of priority and collision handling techniques for wireless communications systems as described herein. For example, the communications manager 1120 may include a control signaling reception component 1125, a monitoring component 1130, a signal communication component 1135, a signal dropping component 1140, or any combination thereof. Each of these components may communicate, directly or indirectly, with one another (e.g., via one or more buses).

The communications manager 1120 may support wireless communications at a UE in accordance with examples as disclosed herein. The control signaling reception component 1125 may be configured as or otherwise support a means for receiving control signaling indicating a first semi-static configuration for transmitting uplink signaling and a second semi-static configuration for receiving downlink signaling. The control signaling reception component 1125 may send a configuration indication 1106 to the monitoring component 1130. The monitoring component 1130 may be configured as or otherwise support a means for monitoring, by the UE operating using half-duplex communication, for a transmission direction conflict between the first semi-static configuration and the second semi-static configuration during a TTI. The monitoring component 1130 may use the configuration indication 1106 to monitor for a conflict between the first semi-static configuration and the second semi-static configuration. The monitoring component 1130 may send a conflict signal 1107 to the signal communication component 1135. The signal communication component 1135 may be configured as or otherwise support a means for communicating, according to a priority rule, one of an uplink signal in accordance with the first semi-static configuration or a downlink signal in accordance with the second semi-static configuration during the TTI based on the monitoring. The signal communication component 1135 may use the conflict signal 1107 to prioritize the uplink signal or the downlink signal based on the transmission direction conflict.

In some examples, the control signaling reception component 1125 may receive configuration signaling 1105, for example, electronically sent from a receiver as described herein. The configuration signaling 1105 may be an example of control information (e.g., from control signaling) indicating a configuration for semi-static, dynamic, or other signaling with the base station. Additionally or alternatively, the monitoring component 1130, the signal communication component 1135, or both may receive the configuration signaling 1105. In some examples, the control signaling reception component 1125 may send the configuration indication 1106 to the monitoring component 1130, which may enable the monitoring component 1130 to monitor for a conflict as described herein. In some examples, the monitoring component 1130 may transmit the conflict signal 1107 to the signal communication component 1135 in response to identifying a conflict. Additionally or alternatively, the monitoring component 1130 may transmit the conflict signal to the signal dropping component 1140.

In some examples, to support communicating, the signal communication component 1135 may be configured as or otherwise support a means for communicating a first signal according to the priority rule indicating to communicate the first signal based on the first signal having a higher priority than a second signal, where the first signal includes the uplink signal and the second signal includes the downlink signal, or the first signal includes the downlink signal and the second signal includes the uplink signal. In some examples, the signal communication component 1135 may use the conflict signal 1107, the configuration signaling 1105, or both to determine the signals which had a conflict.

In some examples, to support communicating, the signal communication component 1135 may be configured as or otherwise support a means for communicating a first signal according to the priority rule indicating to communicate the first signal based on the first signal including first information having a first priority and a second signal including second information having a second priority lower than the first priority, where the first signal includes the uplink signal and the second signal includes the downlink signal, or the first signal includes the downlink signal and the second signal includes the uplink signal.

In some examples, to support communicating, the signal communication component 1135 may be configured as or otherwise support a means for communicating a first signal according to the priority rule indicating to communicate the first signal based on the first signal including an aperiodic signal and a second signal including a semi-persistent signal or a periodic signal, or the first signal including the semi-persistent signal and the second signal including the periodic signal, where the first signal includes the uplink signal and the second signal includes the downlink signal, or the first signal includes the downlink signal and the second signal includes the uplink signal.

In some examples, to support communicating, the signal communication component 1135 may be configured as or otherwise support a means for communicating a first signal according to the priority rule indicating to communicate the first signal based on the first signal including a first quantity of symbols higher than a second quantity of symbols of a second signal, where the first signal includes the uplink signal and the second signal includes the downlink signal, or the first signal includes the downlink signal and the second signal includes the uplink signal.

In some examples, to support communicating, the signal communication component 1135 may be configured as or otherwise support a means for communicating a first signal according to the priority rule indicating to communicate the first signal based on the first signal having a longer format length than a format length of a second signal, where the first signal includes the uplink signal and the second signal includes the downlink signal, or the first signal includes the downlink signal and the second signal includes the uplink signal. In some examples, to support communicating, the signal communication component 1135 may be configured as or otherwise support a means for communicating one of a first signal or a second signal according to the priority rule indicating to communicate one of the first signal or the second signal in a same transmission direction as a time duration preceding a resource allocated for communicating one of the first signal or the second signal, where the first signal includes the uplink signal and the second signal includes the downlink signal, or the first signal includes the downlink signal and the second signal includes the uplink signal.

In some examples, to support communicating, the signal communication component 1135 may be configured as or otherwise support a means for communicating the uplink signal according to the priority rule indicating to communicate the uplink signal based on the transmission direction conflict indicating a direction mismatch corresponding to resources of the downlink signal overlapping with an uplink subband of the full duplex TTI. In some examples, TTI includes a full duplex TTI.

In some examples, to support communicating, the signal communication component 1135 may be configured as or otherwise support a means for communicating the uplink signal according to the priority rule indicating to communicate the uplink signal based on resources of the uplink signal fully overlapping with an uplink subband in the full duplex TTI, where the full duplex TTI includes the uplink subband and a flexible subband.

In some examples, to support communicating, the signal communication component 1135 may be configured as or otherwise support a means for communicating the downlink signal according to the priority rule indicating to communicate the downlink signal based on resources of the downlink signal fully overlapping with a downlink subband in the full duplex TTI, where the full duplex TTI includes the downlink subband and a flexible subband.

In some examples, to support communicating, the monitoring component 1130 may be configured as or otherwise support a means for identifying an absence of the transmission direction conflict based on monitoring for the transmission direction conflict between the first semi-static configuration and the second semi-static configuration during the full duplex TTI, and where the communicating is based on the absence of the transmission direction conflict and the full duplex TTI including a downlink subband and an uplink subband.

In some examples, to support communicating, the signal communication component 1135 may be configured as or otherwise support a means for communicating, according to the priority rule, a first signal on a first CC in a same direction as a second signal on a second CC based on the transmission direction conflict occurring in the first CC, where the priority rule indicates to communicate the first signal on the first CC in the same direction as the second signal communicated on the second CC, where the first signal includes the uplink signal or the downlink signal.

In some examples, to support communicating, the signal communication component 1135 may be configured as or otherwise support a means for communicating, according to the priority rule, a first signal on a first CC in a same direction as a second signal on a second CC based on the transmission direction conflict occurring in the first CC, where the priority rule indicates to communicate the first signal on the first CC in the same direction as the second signal on the second CC based on a majority of directions of a set of multiple CCs including the direction of the first signal that is the uplink signal or the downlink signal.

In some examples, to support communicating, the signal communication component 1135 may be configured as or otherwise support a means for communicating, according to the priority rule, a first signal on a first CC in a same direction as a second signal on a second CC based on the second CC corresponding to a Pcell or an SPcell.

In some examples, to support communicating, the signal communication component 1135 may be configured as or otherwise support a means for communicating a first signal on a first CC and a second signal on a second CC according to the priority rule indicating to communicate the first signal based on a frequency separation between the first signal on the first CC and the second signal on the second CC satisfying a threshold, where the first signal includes the uplink signal and the second signal includes the downlink signal, or the first signal includes the downlink signal and the second signal includes the uplink signal.

In some examples, the signal dropping component 1140 may be configured as or otherwise support a means for dropping the uplink signal or the downlink signal based on the priority rule indicating to drop the uplink signal or the downlink signal or a means for dropping a portion of the uplink signal or the downlink signal according to the priority rule indicating to partially or fully drop the uplink signal or the downlink signal based on a capability of the UE. The signal dropping component 1140 may use the separation signal 1194 to determine which signal to drop or communicate. In some cases, the signal dropping component 1140 may transmit a dropped signal indication 1109 to the signal communication component 1135 to indicate which signal was dropped instead of communicated. In some examples, the first semi-static configuration includes a first periodicity for transmitting the uplink signaling and the second semi-static configuration includes a second periodicity for receiving.

In some examples, the signal communication component 1135 may transmit uplink information 1110. For example, the signal communication component 1135 may transmit uplink information 1110 (e.g., to a transmitter) based on a priority rule indicating to transmit the uplink information 1110. In some examples, the signal communication component 1135 may receive downlink information 1111. For example, a receiver may electronically send the downlink information 1111 to the signal communication component 1135 if a priority rule indicates to communicate a downlink signal.

In some examples, the signal dropping component 1140 may additionally or alternatively determine to communicate in accordance with one or more priority rules as described herein. For example, the signal dropping component 1140 may receive the conflict signal 1107 and determine to drop an uplink signal or downlink signal based on the received conflict signal 1107 or other information or signaling described in FIG. 11. The signal dropping component 1140 may transmit a dropped signal indication 1109 to the signal communication component 1135, indicating which signal was dropped. Thus, the signal communication component 1135 may communicate (e.g., receive or transmit) signals that were not included in the dropped signal indication 1109 and refrain from communicating (e.g., partially or fully drop) signals included in the dropped signal indication 1109. In some examples, the signal communication component 1135 may pass on conflict information 1108 to the signal dropping component 1140.

Figure 12:
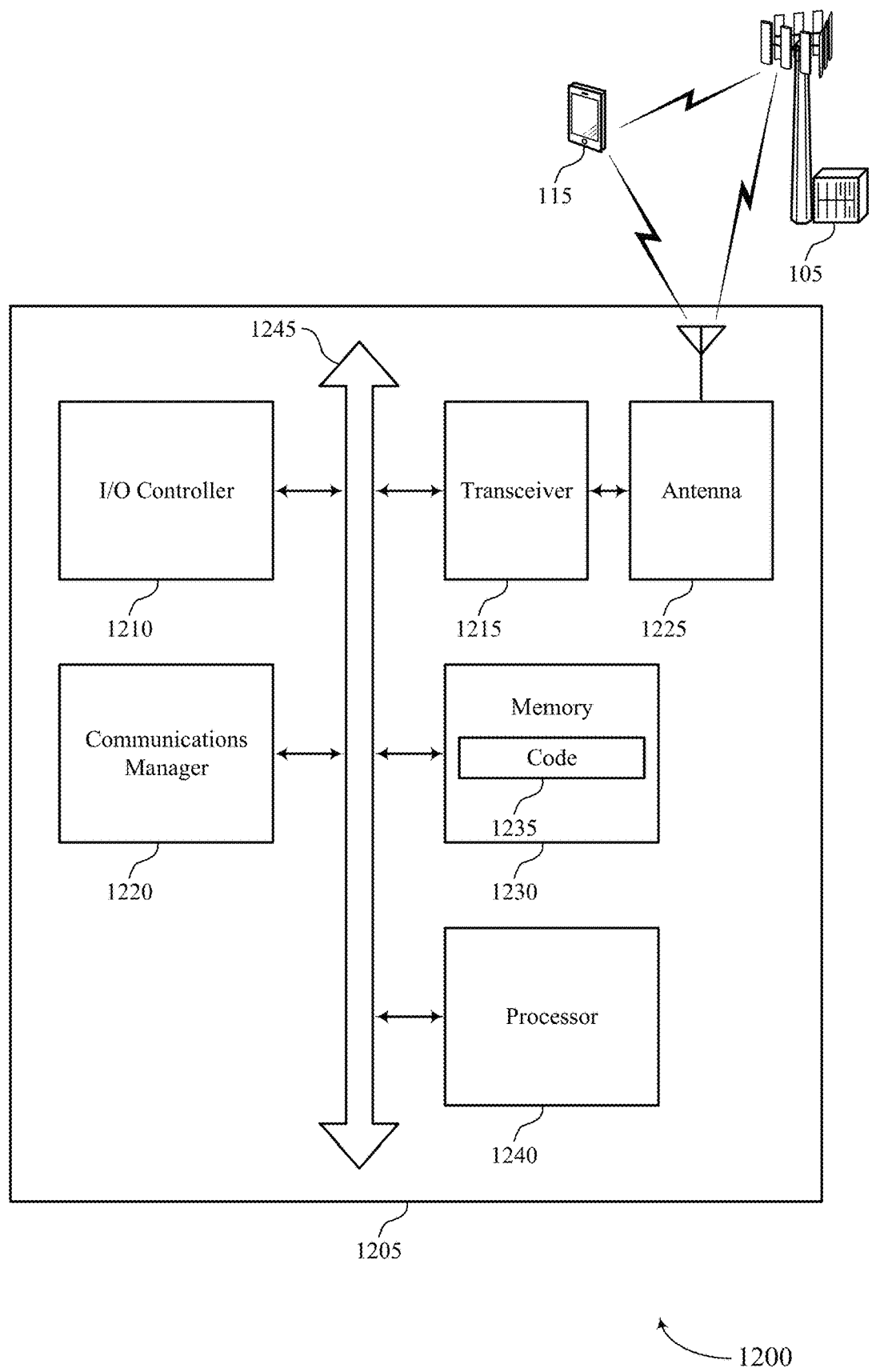
FIG. 12 shows a diagram of a system including a device that supports priority and collision handling techniques for wireless communications systems in accordance with aspects of the present disclosure.

FIG. 12 shows a diagram of a system 1200 including a device 1205 that supports priority and collision handling techniques for wireless communications systems in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting priority and collision handling techniques for wireless communications systems). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving control signaling indicating a first semi-static configuration for transmitting uplink signaling and a second semi-static configuration for receiving downlink signaling. In some cases, the control signaling may be at least one RRC message. The communications manager 1220 may be configured as or otherwise support a means for monitoring, by the UE operating using half-duplex communication, for a transmission direction conflict between the first semi-static configuration and the second semi-static configuration during a TTI. The communications manager 1220 may be configured as or otherwise support a means for communicating, according to a priority rule, one of an uplink signal in accordance with the first semi-static configuration or a downlink signal in accordance with the second semi-static configuration during the TTI based on the monitoring.

By including or configuring the communications manager 1220 in accordance with examples as described herein, the device 1205 may support techniques for priority and collision handling for wireless communications systems which may reduce power consumption and latency. As such, supported techniques may include improved network operations, and, in some examples, may promote network efficiencies, among other benefits.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of priority and collision handling techniques for wireless communications systems as described herein, or the processor 1240 and the memory 1230 may be otherwise configured to perform or support such operations.

Figure 13:
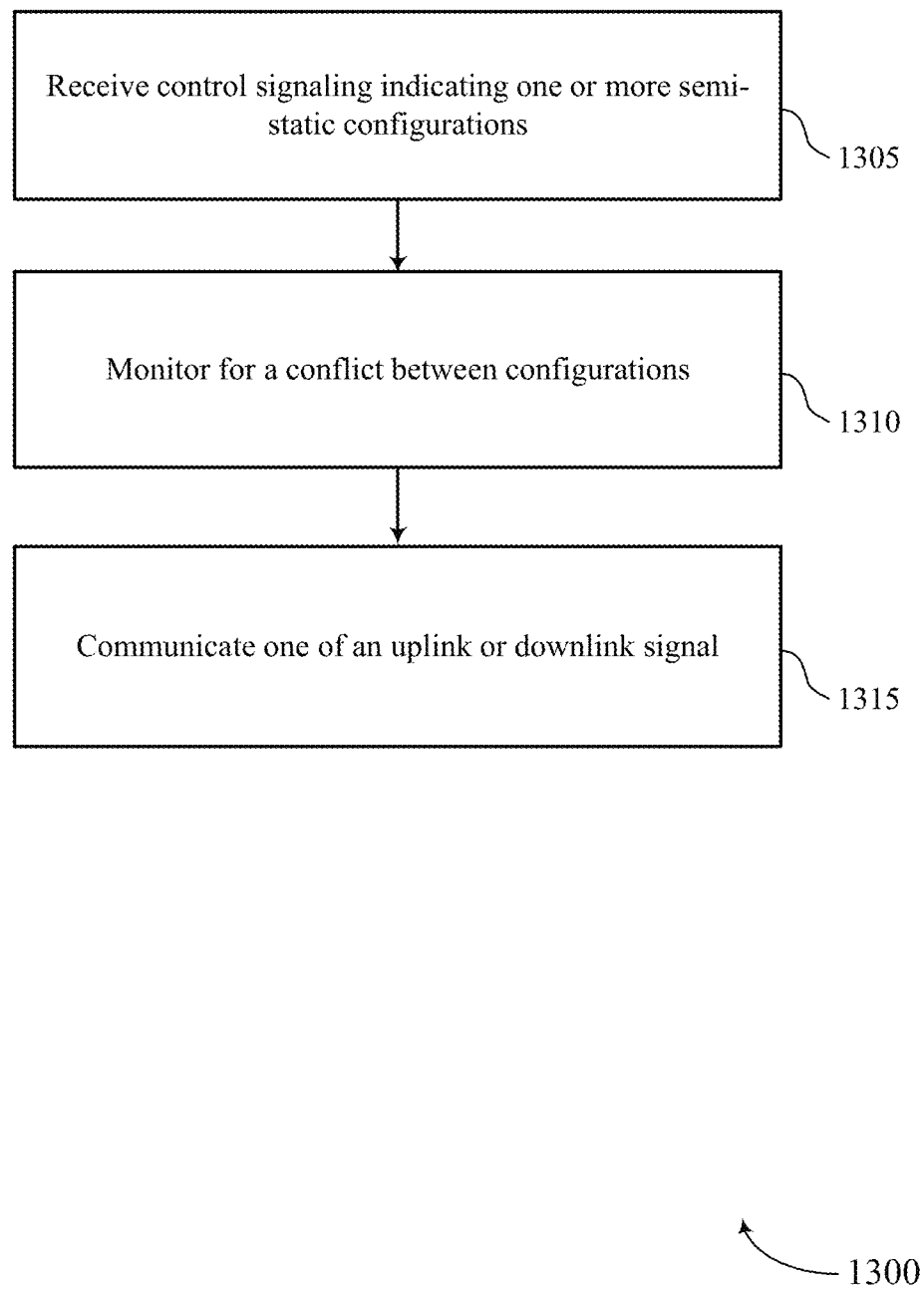
FIGS. 13 and 14 show flowcharts illustrating one or more methods that support priority and collision handling techniques for wireless communications systems in accordance with aspects of the present disclosure.

FIG. 13 shows a flowchart illustrating a method 1300 that supports priority and collision handling techniques for wireless communications systems in accordance with aspects of the present disclosure. The operations of the method 1300 may be implemented by a UE or its components as described herein. For example, the operations of the method 1300 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating one or more semi-static configurations. For example, the method may include receiving control signaling indicating a first semi-static configuration for transmitting uplink signaling and a second semi-static configuration for receiving downlink signaling. In some cases, the method may include receiving the control signaling that is at least one radio resource control message. The operations of 1305 may be performed in accordance with examples as disclosed herein. In some examples, aspects of the operations of 1305 may be performed by a control signaling reception component 1125 as described with reference to FIG. 11. In some cases, the first semi-static configuration and the second semi-static configuration may correspond to a direction (e.g., uplink or downlink) configured for UE communications. For example, the UE may receive the configurations scheduling periodic uplink transmission signaling and periodic downlink transmission signaling (e.g., each direction of signaling may include a respective periodicity).

At 1310, the method may include monitoring for a conflict between configurations. For example, the method may include monitoring, by a UE operating using half-duplex communication, for a transmission direction conflict between the first semi-static configuration and the second semi-static configuration during a TTI. The operations of 1310 may be performed in accordance with examples as disclosed herein. In some examples, aspects of the operations of 1310 may be performed by a monitoring component 1130 as described with reference to FIG. 11. In some cases, the transmission direction conflict may be based on whether the UE operates using half-duplex communications or is capable of identifying full-duplex communications. In some cases, the transmission direction conflict may depend on whether the TTI is a flexible TTI or a full-duplex TTI supported by the UE. For example, the UE may determine that an instance of the uplink signaling and an instance of the downlink signaling overlaps or is otherwise scheduled for a same TTI, subband, or both as described herein with reference to FIGS. 1-7.

At 1315, the method may include communicating one of an uplink or downlink signal. For example, the method may include communicating, according to a priority rule, one of an uplink signal in accordance with the first semi-static configuration or a downlink signal in accordance with the second semi-static configuration during the TTI based on the monitoring. The operations of 1315 may be performed in accordance with examples as disclosed herein. In some examples, aspects of the operations of 1315 may be performed by a signal communication component 1135 as described with reference to FIG. 11. In some cases, the UE may drop the uplink signal and receive the downlink signal, or drop the downlink signal and transmit the uplink signal in accordance with one or more priority rules as described herein. For example, the UE may communicate a signal associated with a higher priority, a signal with higher priority data, a signal with higher priority time domain behavior, a signal with a greater quantity of symbols, a signal in a same or different direction from the direction of the symbols preceding the conflict, or any combination thereof, as described herein with reference to FIGS. 1-7.

Figure 14:
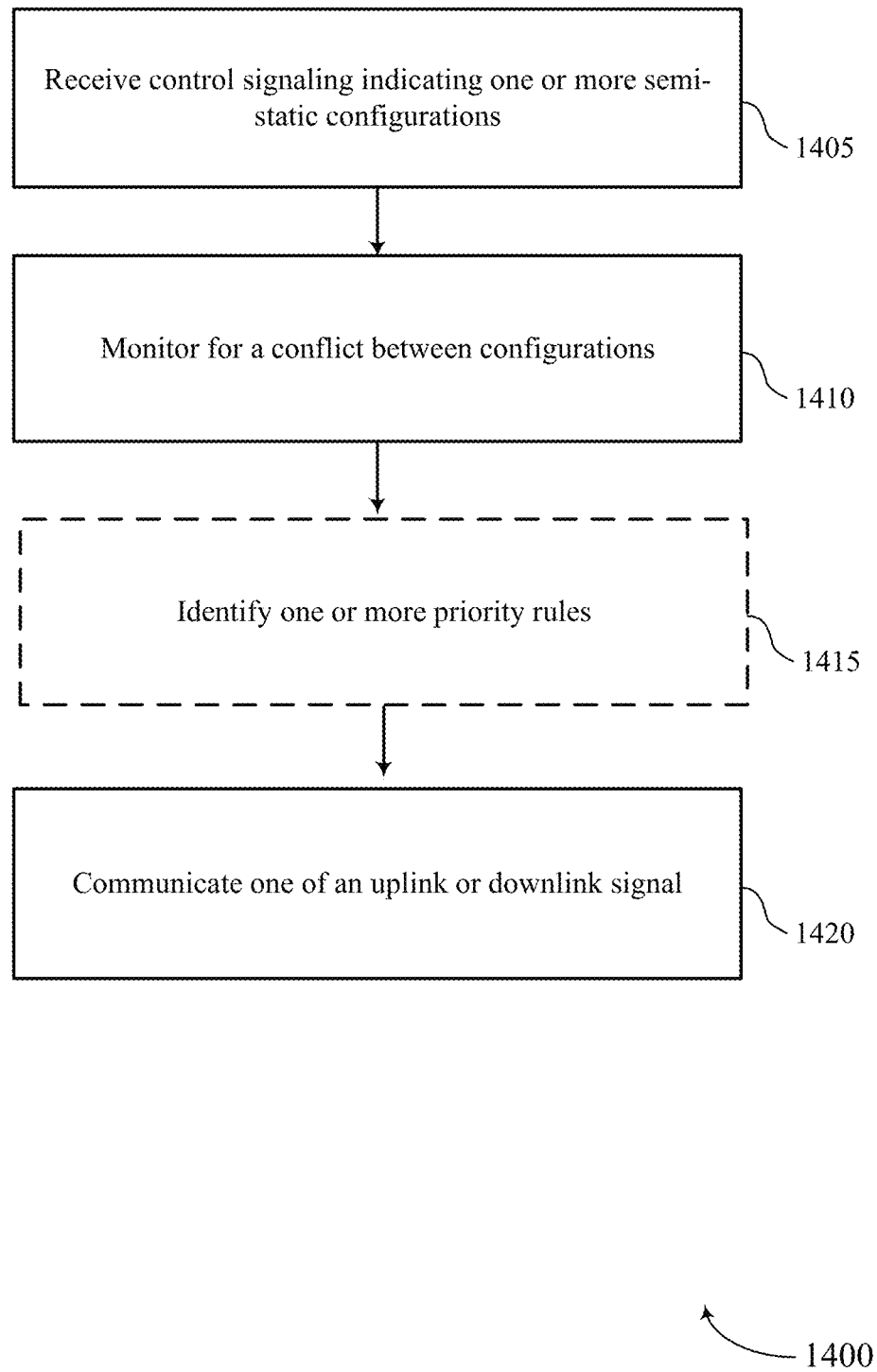

FIG. 14 shows a flowchart illustrating a method 1400 that supports priority and collision handling techniques for wireless communications systems in accordance with aspects of the present disclosure. The operations of the method 1400 may be implemented by a UE or its components as described herein. For example, the operations of the method 1400 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating one or more semi-static configurations. For example, the method may include receiving control signaling indicating a first semi-static configuration for transmitting uplink signaling and a second semi-static configuration for receiving downlink signaling. The operations of 1405 may be performed in accordance with examples as disclosed herein. In some examples, aspects of the operations of 1405 may be performed by a control signaling reception component 1125 as described with reference to FIG. 11. In some cases, the first semi-static configuration and the second semi-static configuration may correspond to a direction (e.g., uplink or downlink) configured for UE communications. For example, the UE may receive the configurations scheduling periodic uplink transmission signaling and periodic downlink transmission signaling (e.g., each direction of signaling may include a respective periodicity).

At 1410, the method may include monitoring for a conflict between configurations. For example, the method may include monitoring, by a UE operating using half-duplex communication, for a transmission direction conflict between the first semi-static configuration and the second semi-static configuration during a TTI. The operations of 1410 may be performed in accordance with examples as disclosed herein. In some examples, aspects of the operations of 1410 may be performed by a monitoring component 1130 as described with reference to FIG. 11. In some cases, the transmission direction conflict may be based on whether the UE operates using half-duplex communications or is capable of identifying full-duplex communications. In some cases, the transmission direction conflict may depend on whether the TTI is a flexible TTI or a full-duplex TTI supported by the UE. For example, the UE may determine that an instance of the uplink signaling and an instance of the downlink signaling overlaps or is otherwise scheduled for a same TTI, subband, or both as described herein with reference to FIGS. 1-7.

In some examples, at 1415 the method may include identifying one or more priority rules. For example, the method may include identifying a priority rule that indicates to communicate a first signal (e.g., the uplink signal or the downlink signal) and drop a second conflicting signal based on the first signal having a higher priority, higher priority contents, a higher priority time domain behavior, a greater quantity of signals, or any combination thereof. The priority rule may additionally or alternatively be an example of one or more other rules as described herein with reference to FIGS. 1-7. For example, the method may include identifying a priority rule indicating which signals to communicate across multiple CCs based on slot formats, priorities, and the like, among other examples of priority rules and schemes. The operations of 1415 may be performed in accordance with examples as disclosed herein. In some examples, aspects of the operations of 1415 may be performed by a signal communication component 1135 as described with reference to FIG. 11.

At 1420, the method may include communicating one of an uplink or downlink signal. For example, the method may include communicating, according to a priority rule, one of an uplink signal in accordance with the first semi-static configuration or a downlink signal in accordance with the second semi-static configuration during the TTI based on the monitoring. The operations of 1420 may be performed in accordance with examples as disclosed herein. In some examples, aspects of the operations of 1420 may be performed by a signal communication component 1135 as described with reference to FIG. 11. In some cases, the UE may drop the uplink signal and receive the downlink signal, or drop the downlink signal and transmit the uplink signal in accordance with one or more priority rules as described herein. For example, the UE may communicate a signal associated with a higher priority, a signal with higher priority data, a signal with higher priority time domain behavior, a signal with a greater quantity of symbols, a signal in a same or different direction from the direction of the symbols preceding the conflict, or any combination thereof, as described herein with reference to FIGS. 1-7.

The following provides an overview of aspects of the present disclosure:

Aspect 1: A method for wireless communications at a UE, comprising: receiving control signaling indicating a first semi-static configuration for transmitting uplink signaling and a second semi-static configuration for receiving downlink signaling; monitoring, by the UE operating using half-duplex communication, for a transmission direction conflict between the first semi-static configuration and the second semi-static configuration during a TTI; communicating, according to a priority rule, one of an uplink signal in accordance with the first semi-static configuration or a downlink signal in accordance with the second semi-static configuration during the TTI based at least in part on the monitoring.

Aspect 2: The method of aspect 1, wherein the communicating further comprises: communicating a first signal according to the priority rule indicating to communicate the first signal based at least in part on the first signal having a higher priority than a second signal, wherein the first signal comprises the uplink signal and the second signal comprises the downlink signal, or the first signal comprises the downlink signal and the second signal comprises the uplink signal.

Aspect 3: The method of any of aspects 1 through 2, wherein the communicating further comprises: communicating a first signal according to the priority rule indicating to communicate the first signal based at least in part on the first signal comprising first information having a first priority and a second signal comprising second information having a second priority lower than the first priority, wherein the first signal comprises the uplink signal and the second signal comprises the downlink signal, or the first signal comprises the downlink signal and the second signal comprises the uplink signal.

Aspect 4: The method of any of aspects 1 through 3, wherein the communicating further comprises: communicating a first signal according to the priority rule indicating to communicate the first signal based at least in part on the first signal comprising an aperiodic signal and a second signal comprising a semi-persistent or a periodic signal, or the first signal comprising the semi-persistent signal and the second signal comprising the periodic signal, wherein the first signal comprises the uplink signal and the second signal comprises the downlink signal, or the first signal comprises the downlink signal and the second signal comprises the uplink signal.

Aspect 5: The method of any of aspects 1 through 4, wherein the communicating further comprises: communicating a first signal according to the priority rule indicating to communicate the first signal based at least in part on the first signal comprising a first quantity of symbols higher than a second quantity of symbols of a second signal, wherein the first signal comprises the uplink signal and the second signal comprises the downlink signal, or the first signal comprises the downlink signal and the second signal comprises the uplink signal.

Aspect 6: The method of any of aspects 1 through 5, wherein the communicating further comprises: communicating a first signal according to the priority rule indicating to communicate the first signal based at least in part on the first signal having a longer format length than a format length of a second signal, wherein the first signal comprises the uplink signal and the second signal comprises the downlink signal, or the first signal comprises the downlink signal and the second signal comprises the uplink signal.

Aspect 7: The method of any of aspects 1 through 6, wherein the communicating further comprises: communicating one of a first signal or a second signal according to the priority rule indicating to communicate one of the first signal or the second signal in a same transmission direction as a time duration preceding a resource allocated for communicating one of the first signal or the second signal, wherein the first signal comprises the uplink signal and the second signal comprises the downlink signal, or the first signal comprises the downlink signal and the second signal comprises the uplink signal.

Aspect 8: The method of any of aspects 1 through 7, wherein the TTI comprises a full duplex TTI, wherein the communicating further comprises: communicating the uplink signal according to the priority rule indicating to communicate the uplink signal based at least in part on the transmission direction conflict indicating a direction mismatch corresponding to resources of the downlink signal overlapping with an uplink subband of the full duplex TTI.

Aspect 9: The method of any of aspects 1 through 8, wherein the TTI comprises a full duplex TTI, wherein the communicating further comprises: communicating the uplink signal according to the priority rule indicating to communicate the uplink signal based at least in part on resources of the uplink signal fully overlapping with an uplink subband in the full duplex TTI, wherein the full duplex TTI comprises the uplink subband and a flexible subband.

Aspect 10: The method of any of aspects 1 through 9, wherein the TTI comprises a full duplex TTI, wherein the communicating further comprises: communicating the downlink signal according to the priority rule indicating to communicate the downlink signal based at least in part on resources of the downlink signal fully overlapping with a downlink subband in the full duplex TTI, wherein the full duplex TTI comprises the downlink subband and a flexible subband.

Aspect 11: The method of any of aspects 1 through 10, wherein the TTI comprises a full duplex TTI, wherein the communicating further comprises: identifying an absence of the transmission direction conflict based at least in part on monitoring for the transmission direction conflict between the first semi-static configuration and the second semi-static configuration during the full duplex TTI, and wherein the communicating is based at least in part on the absence of the transmission direction conflict and the full duplex TTI comprising a downlink subband and an uplink subband.

Aspect 12: The method of any of aspects 1 through 11, wherein the communicating further comprises: communicating, according to the priority rule, a first signal on a first CC in a same direction as a second signal on a second CC based at least in part on the transmission direction conflict occurring in the first CC, wherein the priority rule indicates to communicate the first signal on the first CC in the same direction as the second signal communicated on the second CC, wherein the first signal comprises the uplink signal or the downlink signal.

Aspect 13: The method of any of aspects 1 through 12, wherein the communicating further comprises: communicating, according to the priority rule, a first signal on a first CC in a same direction as a second signal on a second CC based at least in part on the transmission direction conflict occurring in the first CC, wherein the priority rule indicates to communicate the first signal on the first CC in the same direction as the second signal on the second CC based at least in part on a majority of directions of a plurality of CCs comprising the direction of the first signal that is the uplink signal or the downlink signal.

Aspect 14: The method of any of aspects 1 through 13, wherein the communicating further comprises: communicating, according to the priority rule, a first signal on a first CC in a same direction as a second signal on a second CC based at least in part on the second CC corresponding to a Pcell or an SPcell.

Aspect 15: The method of any of aspects 1 through 14, wherein the communicating further comprises: communicating a first signal on a first CC and a second signal on a second CC according to the priority rule indicating to communicate the first signal based at least in part on a frequency separation between the first signal on the first CC and the second signal on the second CC satisfying a threshold, wherein the first signal comprises the uplink signal and the second signal comprises the downlink signal, or the first signal comprises the downlink signal and the second signal comprises the uplink signal.

Aspect 16: The method of any of aspects 1 through 15, further comprising: dropping the uplink signal or the downlink signal based at least in part on the priority rule indicating to drop the uplink signal or the downlink signal; or dropping a portion of the uplink signal or the downlink signal according to the priority rule indicating to partially or fully drop the uplink signal or the downlink signal based at least in part on a capability of the UE.

Aspect 17: The method of any of aspects 1 through 16, further comprising: receiving the control signaling that is at least one radio resource control message.

Aspect 18: The method of any of aspects 1 through 17, wherein the first semi-static configuration comprises a first periodicity for transmitting the uplink signaling and the second semi-static configuration comprises a second periodicity for receiving the downlink signaling.

Aspect 19: An apparatus for wireless communications at a UE, comprising a processor; memory coupled with the processor; and instructions stored in the memory and executable by the processor to cause the apparatus to perform a method of any of aspects 1 through 18.

Aspect 20: An apparatus for wireless communications at a UE, comprising at least one means for performing a method of any of aspects 1 through 18.

Aspect 21: A non-transitory computer-readable medium storing code for wireless communications at a UE, the code comprising instructions executable by a processor to perform a method of any of aspects 1 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. For example, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
   at least one memory; and
   at least one processor coupled to the at least one memory, wherein the at least one processor is configured to:
   receive control signaling indicating a first semi-static configuration for transmitting uplink signaling and a second semi-static configuration for receiving downlink signaling;
   monitor, by the UE operating using half-duplex communication, for a transmission direction conflict between the first semi-static configuration and the second semi-static configuration during a transmission time interval;
   communicate, according to at least one priority rule, a first signal selected from one of an uplink signal in accordance with the first semi-static configuration or a downlink signal in accordance with the second semi-static configuration during the transmission time interval based at least in part on the monitoring, the at least one priority rule indicating to select the first signal based at least in part on a first quantity of symbols of the uplink signal and a second quantity of symbols of the downlink signal.

2. The UE of claim 1, wherein the at least one processor is configured to:
   communicate a second signal according to the at least one priority rule indicating to communicate the second signal based at least in part on the second signal having a higher priority than a third signal, wherein the second signal comprises an uplink signal and the third signal comprises a downlink signal, or the second signal comprises a downlink signal and the third signal comprises an uplink signal.

3. The UE of claim 1, wherein the at least one processor is configured to:
   communicate a second signal according to the at least one priority rule indicating to communicate the second signal based at least in part on the second signal comprising first information having a first priority and a third signal comprising second information having a second priority lower than the first priority, wherein the second signal comprises an uplink signal and the third signal comprises a downlink signal, or the second signal comprises a downlink signal and the third signal comprises an uplink signal.

4. The UE of claim 1, wherein the at least one processor is configured to:
   communicate a second signal according to the at least one priority rule indicating to communicate the second signal based at least in part on the second signal comprising an aperiodic signal and a third signal comprising a semi-persistent signal or a periodic signal, or the second signal comprising the semi-persistent signal and the third signal comprising the periodic signal, wherein the second signal comprises an uplink signal and the third signal comprises a downlink signal, or the second signal comprises a downlink signal and the third signal comprises an uplink signal.

5. The UE of claim 1, wherein the at least one processor is configured to:
   communicate the first signal according to the at least one priority rule indicating to communicate the first signal based at least in part on the first signal comprising the first quantity of symbols higher than the second quantity of symbols of a second signal, wherein the first signal comprises the uplink signal and the second signal comprises the downlink signal, or the first signal comprises the downlink signal and the second signal comprises the uplink signal.

6. The UE of claim 1, wherein the at least one processor is configured to:
   communicate a second signal according to the at least one priority rule indicating to communicate the second signal based at least in part on the second signal having a longer format length than a format length of a third signal, wherein the second signal comprises an uplink signal and the third signal comprises a downlink signal, or the second signal comprises a downlink signal and the third signal comprises an uplink signal.

7. The UE of claim 1, wherein the at least one processor is configured to:
   communicate one of a second signal or a third signal according to the at least one priority rule indicating to communicate one of the second signal or the third signal in a same transmission direction as a time duration preceding a resource allocated for communicating one of the second signal or the third signal, wherein the second signal comprises an uplink signal and the third signal comprises a downlink signal, or the second signal comprises a downlink signal and the third signal comprises an uplink signal.

8. The UE of claim 1, wherein the transmission time interval comprises a full duplex transmission time interval, and wherein the at least one processor is configured to:
   communicate a second signal comprising an uplink signal according to the at least one priority rule indicating to communicate the second signal based at least in part on the transmission direction conflict indicating a direction mismatch corresponding to resources of a third signal comprising a downlink signal overlapping with an uplink subband of the full duplex transmission time interval.

9. The UE of claim 1, wherein the transmission time interval comprises a full duplex transmission time interval, and wherein the at least one processor is configured to:
   communicate a second signal comprising an uplink signal according to the at least one priority rule indicating to communicate the second signal based at least in part on resources of the second signal fully overlapping with an uplink subband in the full duplex transmission time interval, wherein the full duplex transmission time interval comprises the uplink subband and a flexible subband.

10. The UE of claim 1, wherein the transmission time interval comprises a full duplex transmission time interval, and wherein the at least one processor is configured to:
    communicate a second signal comprising a downlink signal according to the at least one priority rule indicating to communicate the second signal based at least in part on resources of the second signal fully overlapping with a downlink subband in the full duplex transmission time interval, wherein the full duplex transmission time interval comprises the downlink subband and a flexible subband.

11. The UE of claim 1, wherein the transmission time interval comprises a full duplex transmission time interval, and wherein the at least one processor is configured to:

identify an absence of the transmission direction conflict based at least in part on monitoring for the transmission direction conflict between the first semi-static configuration and the second semi-static configuration during the full duplex transmission time interval, and wherein the communicating is based at least in part on the absence of the transmission direction conflict and the full duplex transmission time interval comprising a downlink subband and an uplink subband.

12. The UE of claim 1, wherein the at least one processor is configured to:
communicate, according to the at least one priority rule, a second signal on a first component carrier in a same direction as a third signal on a second component carrier based at least in part on the transmission direction conflict occurring in the first component carrier, wherein the at least one priority rule indicates to communicate the second signal on the first component carrier in the same direction as the third signal communicated on the second component carrier, wherein the second signal comprises an uplink signal or a downlink signal.

13. The UE of claim 1, wherein the at least one processor is configured to:
communicate, according to the at least one priority rule, a second signal on a first component carrier in a same direction as a third signal on a second component carrier based at least in part on the transmission direction conflict occurring in the first component carrier, wherein the at least one priority rule indicates to communicate the second signal on the first component carrier in the same direction as the third signal on the second component carrier based at least in part on a majority of directions of a plurality of component carriers comprising the direction of the second signal that is an uplink signal or a downlink signal.

14. The UE of claim 1, wherein the at least one processor is configured to:
communicate, according to the at least one priority rule, a second signal on a first component carrier in a same direction as a third signal on a second component carrier based at least in part on the second component carrier corresponding to a primary cell or a secondary primary cell.

15. The UE of claim 1, wherein the at least one processor is configured to:
communicate a second signal on a first component carrier and a third signal on a second component carrier according to the at least one priority rule indicating to communicate the second signal based at least in part on a frequency separation between the second signal on the first component carrier and the third signal on the second component carrier satisfying a threshold, wherein the second signal comprises an uplink signal and the third signal comprises a downlink signal, or the second signal comprises a downlink signal and the third signal comprises an uplink signal.

16. The UE of claim 1, wherein the at least one processor is configured to:
drop the uplink signal or the downlink signal based at least in part on the at least one priority rule indicating to drop the uplink signal or the downlink signal; or
drop a portion of the uplink signal or the downlink signal according to the at least one priority rule indicating to partially or fully drop the uplink signal or the downlink signal based at least in part on a capability of the UE.

17. The UE of claim 1, wherein the at least one processor is configured to:
receive the control signaling that is at least one radio resource control message.

18. The UE of claim 1, wherein the first semi-static configuration comprises a first periodicity for transmitting the uplink signaling and the second semi-static configuration comprises a second periodicity for receiving the downlink signaling.

19. A method for wireless communications at a user equipment (UE), comprising:
receiving control signaling indicating a first semi-static configuration for transmitting uplink signaling and a second semi-static configuration for receiving downlink signaling;
monitoring, by the UE operating using half-duplex communication, for a transmission direction conflict between the first semi-static configuration and the second semi-static configuration during a transmission time interval;
communicating, according to at least one priority rule, a first signal selected from one of an uplink signal in accordance with the first semi-static configuration or a downlink signal in accordance with the second semi-static configuration during the transmission time interval based at least in part on the monitoring, the at least one priority rule indicating to select the first signal based at least in part on a first quantity of symbols of the uplink signal and a second quantity of symbols of the downlink signal.

20. The method of claim 19, wherein the communicating further comprises:
communicating a second signal according to the at least one priority rule indicating to communicate the second signal based at least in part on the second signal having a higher priority than a third signal, wherein the second signal comprises an uplink signal and the third signal comprises a downlink signal, or the second signal comprises a downlink signal and the third signal comprises an uplink signal.

21. The method of claim 19, wherein the communicating further comprises:
communicating a second signal according to the at least one priority rule indicating to communicate the second signal based at least in part on the second signal comprising first information having a first priority and a third signal comprising second information having a second priority lower than the first priority, wherein the second signal comprises an uplink signal and the third signal comprises a downlink signal, or the second signal comprises a downlink signal and the third signal comprises an uplink signal.

22. The method of claim 19, wherein the communicating further comprises:
communicating a second signal according to the at least one priority rule indicating to communicate the second signal based at least in part on the second signal comprising an aperiodic signal and a third signal comprising a semi-persistent signal or a periodic signal, or the second signal comprising the semi-persistent signal and the third signal comprising the periodic signal, wherein the second signal comprises an uplink signal and the third signal comprises a downlink signal, or the second signal comprises a downlink signal and the third signal comprises an uplink signal.

23. The method of claim 19, wherein the communicating further comprises:

communicating the first signal according to the at least one priority rule indicating to communicate the first signal based at least in part on the first signal comprising the first quantity of symbols higher than the second quantity of symbols of a second signal, wherein the first signal comprises the uplink signal and the second signal comprises the downlink signal, or the first signal comprises the downlink signal and the second signal comprises the uplink signal.

24. The method of claim 19, wherein the communicating further comprises:
communicating a second signal according to the at least one priority rule indicating to communicate the second signal based at least in part on the second signal having a longer format length than a format length of a third signal, wherein the second signal comprises an uplink signal and the third signal comprises a downlink signal, or the second signal comprises a downlink signal and the third signal comprises an uplink signal.

25. The method of claim 19, wherein the communicating further comprises:
communicating one of a second signal or a third signal according to the at least one priority rule indicating to communicate one of the second signal or the third signal in a same transmission direction as a time duration preceding a resource allocated for communicating one of the second signal or the third signal, wherein the second signal comprises an uplink signal and the third signal comprises a downlink signal, or the second signal comprises a downlink signal and the third signal comprises an uplink signal.

26. The method of claim 19, wherein the transmission time interval comprises a full duplex transmission time interval, wherein the communicating further comprises:
communicating a second signal comprising an uplink signal according to the at least one priority rule indicating to communicate the second signal based at least in part on the transmission direction conflict indicating a direction mismatch corresponding to resources of a third signal comprising a downlink signal overlapping with an uplink subband of the full duplex transmission time interval.

27. The method of claim 19, wherein the transmission time interval comprises a full duplex transmission time interval, wherein the communicating further comprises:
communicating a second signal comprising an uplink signal according to the at least one priority rule indicating to communicate the second signal based at least in part on resources of the second signal fully overlapping with an uplink subband in the full duplex transmission time interval, wherein the full duplex transmission time interval comprises the uplink subband and a flexible subband.

28. The method of claim 19, wherein the transmission time interval comprises a full duplex transmission time interval, wherein the communicating further comprises:
communicating a second signal comprising an downlink signal according to the at least one priority rule indicating to communicate the second signal based at least in part on resources of the second signal fully overlapping with a downlink subband in the full duplex transmission time interval, wherein the full duplex transmission time interval comprises the downlink subband and a flexible subband.

29. An apparatus for wireless communications at a user equipment (UE), comprising:
means for receiving control signaling indicating a first semi-static configuration for transmitting uplink signaling and a second semi-static configuration for receiving downlink signaling;
means for monitoring, by the UE operating using half-duplex communication, for a transmission direction conflict between the first semi-static configuration and the second semi-static configuration during a transmission time interval;
means for communicating, according to at least one priority rule, a first signal selected from one of an uplink signal in accordance with the first semi-static configuration or a downlink signal in accordance with the second semi-static configuration during the transmission time interval based at least in part on the monitoring, the at least one priority rule indicating to select the first signal based at least in part on a first quantity of symbols of the uplink signal and a second quantity of symbols of the downlink signal.

30. A non-transitory computer-readable medium storing code for wireless communications at a user equipment (UE), the code comprising instructions executable by a processor to:
receive control signaling indicating a first semi-static configuration for transmitting uplink signaling and a second semi-static configuration for receiving downlink signaling;
monitor, by the UE operating using half-duplex communication, for a transmission direction conflict between the first semi-static configuration and the second semi-static configuration during a transmission time interval;
communicate, according to at least one priority rule, a first signal selected from one of an uplink signal in accordance with the first semi-static configuration or a downlink signal in accordance with the second semi-static configuration during the transmission time interval based at least in part on the monitoring, the at least one priority rule indicating to select the first signal based at least in part on a first quantity of symbols of the uplink signal and a second quantity of symbols of the downlink signal.

* * * * *